(12) United States Patent
Dandl et al.

(10) Patent No.: US 12,162,205 B2
(45) Date of Patent: *Dec. 10, 2024

(54) GRIPPER FOR A DRAPING FRAME AND FOR A DEVICE, DRAPING FRAME, DEVICE AND METHOD FOR THE FORMING OF AND/OR COVERING USING A FILM ELEMENT, SYSTEM FOR MANUFACTURING A MOULDED PART OR A COVERED COMPONENT, METHOD FOR RETRO-FITTING A DEVICE OF THIS TYPE, METHOD FOR MANUFACTURING A COVERED COMPONENT

(71) Applicant: Lisa Dräxlmaier Gmbh, Vilsbiburg (DE)

(72) Inventors: Andreas Dandl, Laufen (DE); Andreas Jung, Laufen (DE); Hubert Rehrl, Teisendorf (DE)

(73) Assignee: DRÄXLMAIER GROUP, Vilsbiburg (DE)

( * ) Notice: Subject to any disclaimer, the term of this patent is extended or adjusted under 35 U.S.C. 154(b) by 522 days.

This patent is subject to a terminal disclaimer.

(21) Appl. No.: 17/278,073

(22) PCT Filed: Sep. 9, 2019

(86) PCT No.: PCT/DE2019/100798
§ 371 (c)(1),
(2) Date: Nov. 3, 2021

(87) PCT Pub. No.: WO2020/057692
PCT Pub. Date: Mar. 26, 2020

(65) Prior Publication Data
US 2022/0040904 A1 Feb. 10, 2022

(30) Foreign Application Priority Data

Sep. 19, 2018 (DE) .................. 10 2018 007 401.4
Nov. 13, 2018 (DE) .................. 10 2018 128 459.4
Jan. 18, 2019 (DE) .................. 10 2019 000 300.4

(51) Int. Cl.
B29C 55/00 (2006.01)
B29C 51/00 (2006.01)
(Continued)

(52) U.S. Cl.
CPC ............ B29C 55/20 (2013.01); B29C 55/165 (2013.01)

(58) Field of Classification Search
CPC .............................. B29C 55/165; B29C 55/20
See application file for complete search history.

(56) References Cited

U.S. PATENT DOCUMENTS 3,466,706 A * 9/1969 Kazuo .................. C08J 3/00
425/398
3,600,746 A * 8/1971 Kostur .................. B29C 55/165
425/383

(Continued)

FOREIGN PATENT DOCUMENTS

CN 107443771 A 12/2017
DE 69909835 T2 4/2004

(Continued)

OTHER PUBLICATIONS

DE-102016012425 (Jung) Sep. 2017 (online machine translation), [Retrieved on Apr. 10, 2023]. Retrieved from: Espacenet (Year: 2017).*

(Continued)

*Primary Examiner* — Alison L Hindenlang
*Assistant Examiner* — Andres E. Behrens, Jr.
(74) *Attorney, Agent, or Firm* — BelayIP

(57) ABSTRACT

A gripper is disclosed for a draping frame having a gripper chassis and at least two opposing mutually movable gripper jaw elements for gripping a film element. The gripper jaw (Continued)

elements are provided on a gripper head part of the gripper. The gripper head part of the gripper is movably mounted, at least with one degree of freedom, relative to the gripper chassis.

7 Claims, 19 Drawing Sheets

(51) Int. Cl.
  *B29C 51/26* (2006.01)
  *B29C 55/16* (2006.01)
  *B29C 55/20* (2006.01)
  *B29C 63/00* (2006.01)
  *B29C 63/02* (2006.01)

(56) References Cited

U.S. PATENT DOCUMENTS

| | | | | |
|---|---|---|---|---|
| 3,827,683 | A * | 8/1974 | Seborg | B29C 51/262 269/9 |
| 4,018,551 | A * | 4/1977 | Shuman | B29C 51/262 269/208 |
| 4,663,094 | A * | 5/1987 | Buck | B29C 51/262 264/522 |
| 5,863,568 | A * | 1/1999 | Tomita | B29C 51/262 425/185 |
| 6,382,953 | B1 * | 5/2002 | Chun | B29C 51/262 425/171 |
| 6,454,557 | B1 * | 9/2002 | Chun | B29C 51/262 425/DIG. 53 |
| 2003/0017227 | A1 * | 1/2003 | Bibeau | B29C 51/262 425/383 |
| 2017/0095969 | A1 | 4/2017 | Degawa et al. | |
| 2020/0215742 | A1 | 7/2020 | Rehrl et al. | |

FOREIGN PATENT DOCUMENTS

| | | | | |
|---|---|---|---|---|
| DE | 102016012425 A1 * | 9/2017 | | B29C 51/04 |
| DE | 102018012425 A1 | 9/2017 | | |
| EP | 2583805 A1 | 4/2013 | | |
| EP | 2875931 A1 | 5/2015 | | |
| WO | WO97/47461 | 12/1997 | | |
| WO | WO2017/215684 | 12/2017 | | |
| WO | WO2017215684 A1 | 12/2017 | | |
| WO | WO00/40392 | 7/2020 | | |

OTHER PUBLICATIONS

DE-102016012425 (Jung) Sep. 2017 (online machine translation), [Retrieved on Jul. 6, 2023]. Retrieved from: Espacenet (Year: 2023).*
Office Action of the Chinese Patent and Trademark Office regarding Chinese Patent Application 201980061429.2, dated Aug. 12, 2022.
English language translation of DE69909835T2.
English language translation of CN107443771 (A).
German Patent and Trademark Office Office Action for DE102019000300.4.
Search Report for PCT/DE2019/100798 in German.
Search Report for PCT/DE2019/100798 in English.

* cited by examiner

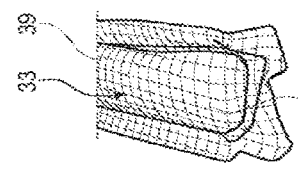
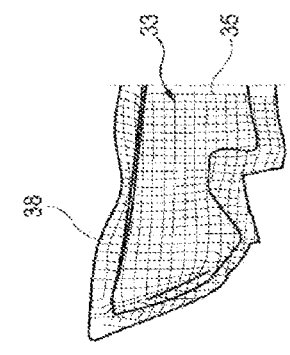
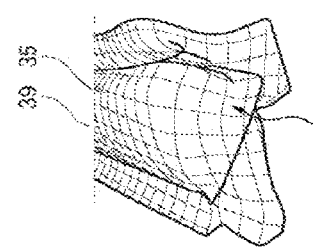
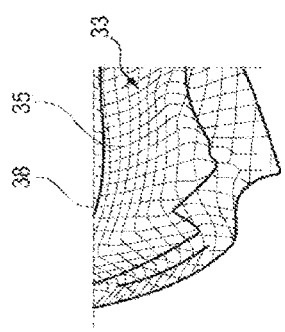
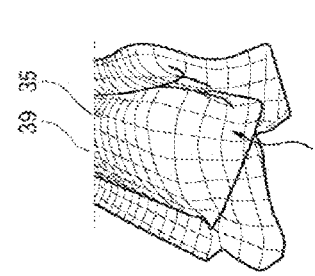

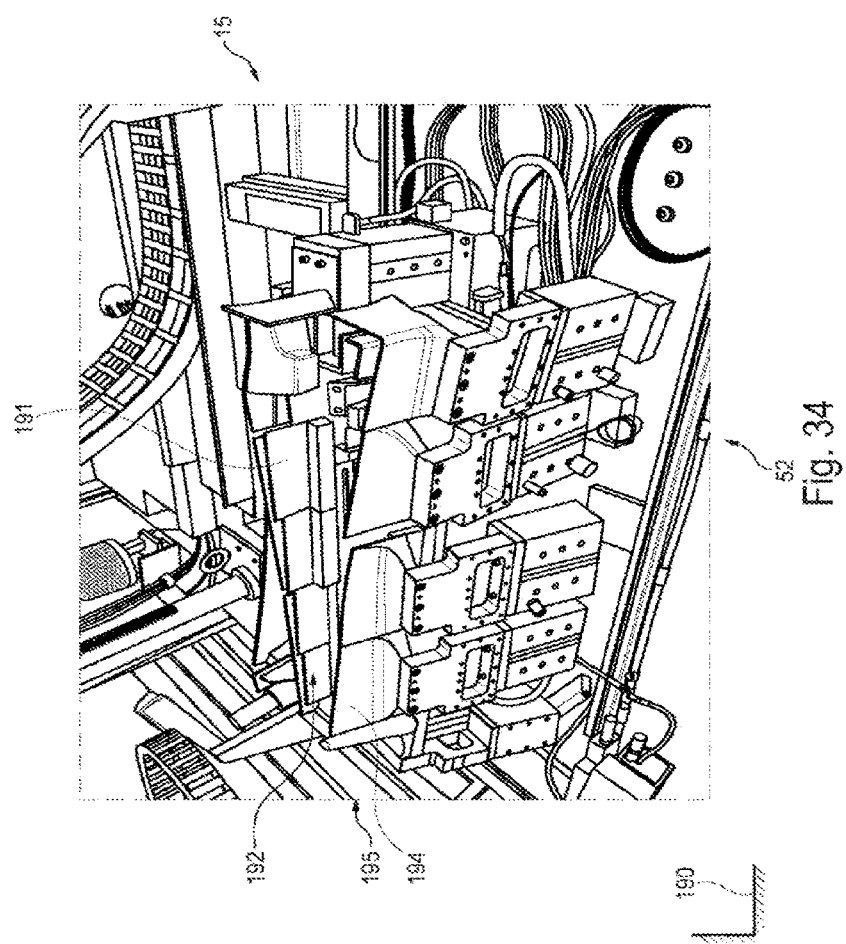

GRIPPER FOR A DRAPING FRAME AND FOR A DEVICE, DRAPING FRAME, DEVICE AND METHOD FOR THE FORMING OF AND/OR COVERING USING A FILM ELEMENT, SYSTEM FOR MANUFACTURING A MOULDED PART OR A COVERED COMPONENT, METHOD FOR RETRO-FITTING A DEVICE OF THIS TYPE, METHOD FOR MANUFACTURING A COVERED COMPONENT

CROSS REFERENCE TO RELATED APPLICATIONS

This application is a national phase of International Application No.: PCT/DE2019/100798, filed on Sep. 9, 2019, which claims priority to German Patent Application 102018007401.4, filed on Sep. 19, 2018; German Patent Application 102018128459.4 filed on Nov. 13, 2018; and German Patent Application 102019000300.4 filed on Jan. 18, 2019. The contents of the above-references applications are expressly incorporated herein by reference to their entireties.

FIELD OF THE INVENTION

The invention relates to a gripper for a draping frame with a gripper chassis and with at least two opposing and mutually movable gripper jaw elements for gripping a film element.

The invention also relates to a gripper for a draping frame having at least two opposing and mutually movable gripper jaw elements for gripping a film element.

The invention further relates to a gripper for a device for forming and/or laminating a film element, in particular for a draping frame, having at least two gripper jaw elements which are located opposite one another and are movable relative to one another for gripping the film element.

The invention further relates to a draping frame for forming and/or laminating a film element.

The invention also relates to a device for forming and/or laminating a film element having a plurality of grips and having a forming tool or a laminating tool in which the forming tool or laminating tool comprises a lower tool and an upper tool.

The invention also relates to a device, on the one hand, for forming and/or laminating a film element, having a frame part which comprises a plurality of grips, and having a forming tool or a laminating tool, wherein the forming tool or the laminating tool (51) comprises a lower tool and an upper tool.

On the other hand, the invention relates to a device for forming and/or laminating a film element with a tool, comprising an exchangeable lower tool and an exchangeable upper tool, which can be exchangeable for a product change. 51

The invention further relates to a device for forming and/or laminating a film element on a carrier part to be laminated.

The invention also relates to a device for laminating a film element on a carrier part, having grippers for gripping the film element, having a carrier part receptacle for holding the carrier part relative to the film element, and having a laminating room, in which the film element is laminated onto the carrier part.

The invention further relates to a system for producing a molded and/or laminated component having at least one processing line and having a device for forming and/or laminating a film element.

The invention further relates to a system for producing a molded and/or laminated component having an input side, having an output side, having at least one processing line between the input side and the output side, and a device for forming and/or laminating a film element.

The invention further relates to a method for forming and/or laminating a film element, wherein the film element is inserted into open grippers and subsequently gripped by the grippers, and in which the film element is also brought into operative contact with a molded part or with a carrier part to be laminated.

The invention also relates to a method for converting a device for forming and/or laminating a film element, wherein the tool is replaced for converting the device to another product, whereby the upper tool and/or the lower tool are replaced.

The invention further relates to a method for forming and/or laminating a film element on a carrier part, wherein the film element and the carrier part are positioned relative to one another for forming and/or laminating.

The invention relates to a method for producing a laminated component from a film element and a carrier part, wherein the film element is laminated onto the carrier part on a laminating device, and in which the laminated component is subsequently removed from the laminating device and made available for further processing.

In particular, devices for forming and/or laminating a film onto a molded part or a carrier part to be laminated are known from the prior art. Such devices usually comprise a clamping frame by means of which the film is stretched in relation to the molded part or the carrier part to be laminated in a film plane, wherein, for example, the molded part or the carrier part to be laminated is then moved through the film plane in order to form or laminate the film.

For example, the European patent application EP 2 397 308 A2 provides a device for stretching and shaping a film blank with such a clamping frame, in which this film blank is clamped between an upper clamping frame and a lower clamping frame of a clamping frame, and is thus held relative to a forming tool. The clamping frame can be adjusted translationally in the x-, y- and z-direction, i. e. along three spatial axes, and can additionally be rotated around a fixed point, i.e. about exactly one spatial axis, in order to ensure that the film blank slides after forming.

DE 699 09 835 D2 also contains a machine for stretching and vacuum forming a rectangular sheet of plastic material, the machine comprising a clamping frame consisting of four clamping strips, by means of which one edge of the rectangular plastic panel can be clamped at a time. Here, two terminal strips are opposite each other in pairs, wherein each terminal strip comprises a plurality of second clamping devices. These second clamping devices are mounted on each terminal strip and can move along the terminal strip length with a low friction coefficient along the respective terminal strip, wherein they are pulled behind by the material plate. In this respect, the second clamping devices move proportionally to the movement of the clamping strips in order to counteract edge distortions.

BACKGROUND OF THE INVENTION

In such clamping frames, considerable tensile forces often act on the film, which can lead to unfavorable, undesirable film elongation under certain circumstances, in particular in curved, bent or undercut areas of the molded part or the carrier part.

Such film elongation can lead to considerable loss of optical quality, especially for films with high-quality, grained or similar valuable surfaces.

In order to avoid or at least mitigate disadvantages in this respect, clamping frames with individual grippers already exist, which grip the film at its edges and then pull over the molded part or the carrier part to be laminated. Such grippers can be used to counteract the risk of undesirably large film stretching.

The aim of the invention is to further develop generic devices, components or component groups thereof, or systems comprising such a device, and corresponding methods. In particular, the aim of the invention is to produce molded and/or laminated components of a higher quality or at least equivalent quality, despite saving in film material.

The aim of the invention is achieved according to a first aspect by a gripper for a device for forming and/or laminating a film element, in particular for a draping frame, with a gripper chassis and with at least two opposite and mutually movable two gripper jaw elements for gripping a film element, wherein the two gripper jaw elements are arranged on a gripper head part of the gripper, and wherein the gripper head part of the gripper is movably mounted with respect to the gripper chassis at least one degree of freedom.

Due to the additional gripper head part, which is movable in relation to the gripper chassis, the film element can be positioned in an even more differentiated manner by means of the grippers in relation to a molded part or a carrier part to be laminated, whereby the risk of excessive film stretching is significantly reduced.

In other words, this means that the gripper head part can be moved in the room, in particular in a draping room or laminating room, independently of a movement of the gripper chassis.

This is particularly advantageous with regard to ever more newly designed and ever more complexly shaped components.

Particularly in the automotive sector, laminated components with increasingly complex designs and surfaces are being created, such as interior door panels, armrests, seat backs and other automotive interior trim parts.

By means of the invention proposed herein, in particular, laminated components of this kind can be produced in a material-saving manner, but nevertheless of high quality, and cost-effective.

At this point it should be mentioned that the terms "laminating", "laminating on", "laminating to" or the like are used synonymously.

In particular, the gripper for gripping the film element can slide into a "bent portion" of the film element and grip the film element there, whereby a further reduction of the required cutting of the film element can be achieved.

In the sense of the invention, the term "gripper" describes a device by means of which the film element, in particular the edges of the film element, can be gripped and held in an operationally reliable manner.

For secure gripping, the gripper has at least two opposing gripper jaw elements that are movable relative to each other.

The gripper jaw elements design two gripping surface parts which can be displaced relative to one another, by means of which different gripping forces or holding forces can also be exerted on the film element to be gripped.

For example, the grippers can cumulatively or alternatively comprise also a suction device in order to grip the film element according to the present invention.

However, the present gripper is particularly characterized by a gripper chassis on which the gripper jaw elements are not directly rigidly arranged except for their gripping movement possibilities, but on which a gripper head part carrying the gripper jaw elements is arranged in an articulated manner, which is interposed between the gripper chassis and the gripper chassis.

The gripper head part is articulated to the gripper chassis in such a way that the gripper head part has at least one degree of freedom with respect to the gripper chassis, while the gripper chassis itself has several, preferably six or more, degrees of freedom on a frame part or the like.

For example, gripper jaw elements can also perform a rolling movement about the longitudinal axis of the gripper jaw elements in order to be able to drape or position the film element in a more differentiated manner in relation to the carrier part in certain areas, before the actual lamination process starts with a differential pressure. In this case, the rolling movement can be carried out independently of a movement of the gripper chassis.

Here, the gripper chassis may comprise all necessary adjustment mechanisms for adjusting, in particular, for spatial adjustment, the gripper, including translation, rotation, pivot axes or the like, or a drive motor or several such drive motors for driving the gripper.

In particular, the actual, mutually movable gripper jaw elements are not attached directly to the gripper chassis, but only indirectly, with the inclusion or intermediate connection of the gripper head part.

This means that the gripper jaw elements, which are movable relative to each other, are mounted on the gripper head part; and the gripper head part is movably mounted on the gripper chassis.

In the context of the invention, the term "film element" preferably describes a prefabricated film, i. e. a film blank which is correspondingly tailored to the molded part or the carrier part to be laminated.

The film element can also be present as an inherently rigid plate element or the like.

The film element can also be realized by a wide variety of materials, so it can also be defined in particular by air-permeable materials, which are also used in press lamination in particular.

In a suitable embodiment of the invention, it is also conceivable to use films in the form of a strip material from a roll or the like.

The term "carrier part" describes a basic body which is preferably three-dimensionally designed. Thus, the carrier part is a preferably three-dimensionally designed structure, in order to be able to produce correspondingly three-dimensional components or parts or laminated components accordingly.

At this point, it should also be pointed out that, in the context of the present patent application, undefined articles and indefinite figures such as "one . . . ", "two . . . " etc., as a rule are used to be understood as minimum information, that is, as at least "one . . . ", at least "two . . . " and so on, unless it is clear from the context or the concrete text of a particular passage that only "one . . . ", exactly "two . . . " and so on should be meant.

Furthermore, it should be mentioned here that in the context of the present patent application the expression "in particular" is always to be understood in such a way that an optional, preferred feature is introduced with this expression. The expression is not to be understood as "and indeed" and not as "namely".

Furthermore, it should be pointed out here that the present invention, with all its embodiments or related constructive and procedural objects, relates not only the variations of vacuum lamination, but also to variations of press lamination, or the like.

The degrees of freedom mentioned here are preferably implemented by means of motorized drive devices, but they can also be manually adjustable as required. Depending on the customer's requirements or a required complexity, individual degrees of freedom can be manually adjustable, while others can be cumulatively or alternatively motorized, in particular automated.

A preferred embodiment provides that the gripper head part of the gripper is movable with respect to at least one spatial axis, which is different from spatial axes of the gripper chassis, with respect to the gripper chassis. This allows the degrees of freedom to be achievable by the grippers to be increased even further.

In this context, it is considered, for example, that the gripper head part can also be arranged on the gripper chassis of the gripper in a multi-axially adjustable manner.

In the sense of the invention, the term "multi-axial" describes a multifunctional or multi-axial spatial freedom of movement of the gripper or, in particular, of the gripper jaw elements, which is formulated by several translatory and/or rotary degrees of freedom along several spatial axes. Here, a translatory movement and a rotary movement can have a common spatial axis or different spatial axes.

Preferably, the gripper head portion can be adjusted three-dimensionally relative to the gripper chassis.

As a result, the gripping and adjustment possibilities of the gripper can be considerably increased in relation to the film element, and in particular in relation to the molded part or the carrier part to be laminated.

In particular, by means of the gripper proposed here, the film element can be gripped in a more differentiated or effective manner, whereby critical film elongation can be very well avoided.

In addition, due to the more differentiated handling, the film element can also be cut extremely tightly with regard to its film surface. This significantly reduces the amount of residual film material around the film element that would otherwise be lost, saving a significant amount of residual film material overall.

It is understood that the articulation between the gripper chassis and the gripper head part can be achieved in different constructive ways. A constructively simple but extremely effective realization of an additional degree of freedom can be provided if the gripper head part of the gripper can be rotated about an axis of rotation by means of a rotary drive.

A rotary drive can be implemented very simply and compactly, for example by a stepper motor or a servo motor. A corresponding rotary movement can be carried out extremely precisely if the rotary actuator has a worm gear.

A particularly profitable additional mobility can be achieved on the gripper if the axis of rotation is arranged perpendicular to an end face of the gripper chassis, i. e. about a horizontal axis. This allows an area of a film element to be unwound particularly precisely with respect to a carrier part.

It has been found that it is advantageous if the gripper head portion of the gripper is rotatable relative to the gripper chassis about a vertical axis and/or about a horizontal axis.

As a result, a film element can be applied to a contour of a carrier part in an even more differentiated manner, in particular stress-free.

A horizontal axis can be realized simply by a rotational axis running transversely to an end face.

According to a second aspect of the invention, the present problem is also solved by a gripper for a device for forming and/or laminating a film element, in particular for a draping frame, having at least two gripper jaw elements, which are located opposite one another and are movable relative to one another for gripping a film element, wherein at least one of the gripper jaw elements has temperature-regulating means, by means of which at least one gripper jaw element can be at least partially temperature regulated.

These temperature-regulating means are preferably implemented as active temperature-regulating means, so that desired target temperatures can be actively controlled and set on the gripper jaw elements.

Such temperature-control agents can have different designs. In particular, the temperature-regulating means can be designed as heating devices or cooling devices.

Just by way of example, it should be mentioned here that the temperature-regulating means can be electrically operated, for example, as heating wires, heating rods or the like.

However, suitable temperature-regulating means may also comprise fluid channels or the like for a heating fluid or cooling fluid, wherein the fluid channels may also be passed through the individual gripper jaw elements.

Advantageously, the gripper jaw elements are at least partially cooled in such a way that even film elements with adhesive over the entire surface can be gripped with the gripper jaw elements, so that this reduces the risk of the grippers, in particular the gripper jaw elements, are directly contaminated with adhesive residues. As a result, such cooled grippers need to be cleaned only less frequently, and nevertheless reliable use of the grippers is guaranteed.

Furthermore, the customer can decide for himself whether he wants to use an adhesive application station for partial adhesive application on the film element, or whether he wants to use the present grippers with cooled gripper jaw elements, to be able to save such an adhesive application station if necessary, for example for cost and/or space reasons.

It is advantageous if at least one of the gripper jaw elements has connection interfaces for temperature-regulating means, so that the gripper jaw elements can be connected to a cooling and/or heating device.

For example, a connection interface comprises a cooling hose coupling by means of which cooling fluid hoses can be connected to fluid channels introduced into the gripper jaw elements.

In connection with a connection interface for temperature-regulating means, electrical plug connectors are also considered as an alternative, in order to be able to supply electrical components located in or on gripper jaw elements with power.

The risk of adhesion, in particular of glue, to temperature-controlled gripper jaw elements of the grippers can additionally be significantly reduced if at least one of the gripper jaw elements has an actively temperature-controlled non-stick contact surface.

Suitable non-stick contact surfaces can be designed in different ways. Preferably, such a non-stick contact surface is designed as a Teflon coating or the like.

However, also other constructive possibilities could be considered here. It should be remembered that, for example, a gripper jaw element is made of a corresponding material which has anti-adhesive effects, such as ceramics or the like.

For the purposes of the invention, the term "non-stick contact surface" essentially describes those areas which can come into effective contact with the film element to be gripped.

In particular, gripping surface parts of gripper jaw elements can be equipped with temperature-regulating means or non-stick contact surfaces.

According to a third aspect, the aim of the invention is also achieved by a gripper for a device for forming and/or laminating a film element, in particular for a draping frame, with at least two opposite and mutually movable gripper jaw elements for gripping the film element, wherein the gripper is provided with transfer means for edge folding a film edge around an edge of a carrier part laminated with the film element.

Such bent means integrated into the gripper can further streamline and optimize a manufacturing process for a laminated component.

If the bent means are arranged on the grippers with at least two gripper jaw elements which are opposite each other and can move towards each other, the grippers for laminating and edge folding can be built very compactly.

The same applies if the bent means are arranged on a gripper chassis and/or on a gripper head part.

The present grippers can be variously arranged on a device for forming and/or laminating a film element. For example, grippers can be arranged on any frame. Or on column-like, preferably individually height-adjustable base platforms, on each of which a gripper is mounted. Particularly simple in design, however, grippers can be integrated into generic devices if they are supported by a frame part, such as the draping frame described here.

According to a fourth aspect of the invention, the problem is further solved by a draping frame for forming and/or laminating a film element having a draping room and having a plurality of motor-driven grippers for gripping the film element, wherein grippers of the draping frame have at least partially at least seven degrees of freedom.

In the sense of the invention, the term "draping frame" describes a frame part for arranging a plurality of grippers in such a way on or in a draping room, that a film element is brought into effective contact first with a molded part or with a carrier part to be laminated by means of the grippers or at least by means of a part of the grippers, and secondly is subsequently laminated to said molded part or to the latter carrier part can only be wound, whereby unnecessary elongation, in particular longitudinal and/or transverse elongation, of the film element can be avoided.

In other words, the film element with the draping frame according to the invention is stretched at least partially no longer or only negligibly, as is the case with conventional known clamping frames.

The invention relates to a draping frame which differs from conventional clamping frames or laminating frames in that the film element is no longer stretched—as previously usual—and thus critically stretched before being subjected to a differential pressure, in particular a vacuum.

The draping frame can be designed as an open frame part, for example as a kind of lattice tube frame, or closed with a converted housing.

The draping room is a working room which is at least partially converted by the draping frame. The draping room is preferably also a laminating room in which a film element can be laminated onto a carrier part.

By providing at least seven degrees of freedom of the grippers, in particular the gripper jaw elements thereof, it is possible to design the film element with the present draping frame in an extraordinarily simple manner, such that the film element is applied to the molded part or the carrier part to be laminated without tension or only with a low, rather negligible tension.

These seven degrees of freedom are particularly available on the gripper jaw elements. More specifically, the gripper jaw elements can move with seven degrees of freedom relative to the draping frame and in particular in the draping room.

In this context, the term "draping" in the sense of the invention describes the two-dimensional holding of a film element in a draping room of a draping frame and, in particular, in a draping plane in front of a molded part or a carrier part to be laminated and the at least partial application of the film element, in particular also to curved surfaces of the molded part or of the carrier part to be laminated.

It is particularly advantageous if the gripper has a gripper chassis which is arranged in a multi-axially adjustable manner with respect to the draping frame having at least two or three, preferably six, degrees of freedom, and the gripper comprises a gripper head part, which has at least one further degree of freedom which is different from the degrees of freedom of the gripper chassis. In this way, it can be achieved in a very compact design that at least seven degrees of freedom are available for the gripper jaw elements, whereby the total number of degrees of freedom is achieved by combining the individual degrees of freedom of the gripper chassis and the gripper head part.

According to a fifth aspect, the aim of the invention is also achieved by a draping frame for forming and/or laminating a film element having a draping room and having a plurality of motor-driven grippers for gripping the film element, wherein the grippers have temperature-control means by means of which the gripper jaw elements can be at least partially temperature-controlled.

As already indicated above, gripper jaw elements of the draping frame can in particular be cooled, whereby even film elements provided with adhesive over the entire surface can be draped with the draping frame in front of a molded part or a carrier part to be laminated, without the grippers, in particular the gripper jaw elements, being critically soiled directly with adhesive residues. As a result, cooled grippers need to be cleaned only less frequently, whereby the draping frame can be used even more reliably.

Furthermore, the customer can decide whether an adhesive application station is to be used in combination with the draping frame for partial adhesive application to the film element, or whether the draping frame is to be equipped with grippers with cooled gripper jaw elements instead. Furthermore, it is very convenient if the draping frame comprises an at least partially heatable draping room, so that a film element already draped in the draping room can still be heated even if it is gripped by the grippers. As a result, the ideal treatment temperature can be maintained at the film element until shortly before it is formed or laminated, whereby an improved form or lamination result can be achieved.

In this respect, it is just as useful if the laminating room can be heated.

According to a sixth aspect, the aim of the invention is further achieved by draping frames for forming and/or laminating a film element having a draping room and having a plurality of motor-driven grippers for gripping the film element, wherein the draping frame is a bent means for edge folding a film edge around an edge of a carrier part laminated with the film element.

If a draping frame is immediately equipped with such transfer means, a manufacturing process for a laminated component can also be further streamlined and optimized.

The invention relates to a preferred embodiment of the present draping frame, wherein the bent means are mounted on at least one of the grippers, are arranged on a gripper chassis of the at least one gripper and/or on a gripper head part of the at least one gripper and/or on at least one gripper jaw element of the at least one gripper. This makes it extremely easy to integrate the materials into the draping frame.

The same also applies, moreover, if the bent means are arranged on the draping frame or a frame part thereof, whereby the combination laminating/bent device can also be provided in a very compact design.

It is understood that the bent means can be of a different design, in particular if they are arranged at different points in the draping frame.

Structurally, the invention can be implemented in a very simple manner if the bent means comprise at least one bent slide element for edge folding the film element or the like.

In any case, the present draping frame can be advantageously further developed by the grippers described here.

According to a seventh aspect, the aim of the invention is achieved by a device for forming and/or laminating a film element having a plurality of grips and having a forming tool or a laminating tool, wherein the forming tool or the laminating tool comprises a lower tool and an upper tool, the device comprising a gripper or a draping frame according to one of the features described herein.

According to an eighth aspect, the aim of the invention is achieved by a device for forming and/or laminating a film element with a frame part which comprises a plurality of grippers and with a forming tool or a laminating tool comprising a lower tool and an upper tool, wherein the frame part comprises a gripper or a draping frame according to one of the features described here.

If the device for forming a film element on a molded part and/or for laminating a film element onto a carrier part is equipped with the present gripper or draping frame, said device can work much more precisely.

The present grippers or the present draping frame alone are an advantageous further development of generic devices, since a film element can now be unwound almost tension-free on the molded part or carrier part by means of the device, as a result of which stretching of the film element can be completely avoided, at least in part.

The device advantageously has a feeding and/or inserting device for feeding and/or inserting a film element to grippers or in grippers, in particular a draping frame of the device. As a result, this makes it very easy to implement an automated transport of the film element into the laminating room or into the draping frame, which can increase the effectiveness of the device.

In particular, the film element can be moved translationally, but also rotationally around a vertical axis, for example, in order to be able to place it appropriately and advantageously in the draping frame and to insert it into open grippers of the draping frame.

The present device can additionally be advantageously further developed by a draping frame which is transversely displaceable relative to a feed and/or insertion path for feeding and/or inserting a film element, by means of which draping frame the fed or inserted film element can be fed, for example, to a lower tool. As a result, the draping frame can be easily moved between a forming or laminating position and an insertion position.

A preferred embodiment provides that the device has a heating unit for heating the film element outside a draping room, in particular of a draping frame of the device, said heating unit can be moved together with a film element along a feed and/or insertion path for feeding or inserting the film element to or into grippers or to or into a draping room, in particular of a draping frame of the device. By means of such a heating unit, it is possible to heat a moving film element in motion during its feed movement thereof, so that the film element no longer has to remain motionless at a heating unit until, for example, a target temperature is reached at the film element. In this respect, the device can be operated even more time effectively.

If the device has a heating unit for heating the film element, which heating unit can be arranged at least partially temporarily within a draping room, in particular a draping frame of the device, the film element can be heated right into the draping frame or draping room, preferably continuously since the feed at the feed and/or insertion section.

It is understood that the features with respect to the heating unit described herein advantageously further develop a generic device even without the other features of the invention.

If the device further has a charging station for charging the device with film elements, the degree of automation of the present device can be increased even further. In particular, this can save operating personnel on the device or be used even more effectively.

A further increase in efficiency can be achieved relatively simply by increasing the degree of automation by design if the device has an insertion device for inserting a carrier part to be laminated into the device, in particular into a draping room of a draping frame of the device.

Such an insertion device can be implemented in various ways on the device, for example in the form of linear conveying devices or the like. For example, the insertion of the carrier part is accomplished by means of a belt conveyor device or the like.

If the device has a removal device for removing a molded part or a laminated component from the device, in particular from a draping room of a draping frame or a laminating room of the device, the device can be advantageously further developed not only on the input side, but also on the output side, in that finished laminated components can also be removed from the device in an automated manner.

Such a removal device can also be implemented in different ways on the device. Here, too, corresponding linear conveying devices, such as belt conveying devices or the like, should be considered.

The structural complexity of the device in this respect can be considerably reduced if the insertion device and the removal device comprise a common transfer station. As a result, the required number of components can be significantly reduced on the device. In this respect, the space required for the system of the device can also be considerably reduced.

It goes without saying that different transfer facilities can be used for this purpose. For example, a suitable transfer device can be designed as a floor conveyor system having different insertion and removal levels.

However, a preferred design variant provides that the common transfer station comprises a common robot device having a preferably multi-axial movable manipulator. Such a robot device can be implemented very compactly on the present device due to its compact design, its flexible movement sequences and so on.

Independently of this, both the insertion device and the removal device can be implemented by such a robot device, if necessary also separately from each other.

According to a ninth aspect, the aim of the invention is achieved by a device for forming and/or laminating a film element with a tool comprising an exchangeable lower tool and an exchangeable upper tool, which can be exchanged for a product change, the device is characterized in that the tool comprises a draping frame equipped with a plurality of grippers, which can be exchanged together with the lower tool and/or the upper tool for the product change.

In this case, the draping frame is a part of the tool temporarily used on the device and can be replaced together with the lower and/or upper tool if this is necessary during a product change. Thus, the present device can be converted to a new product much faster than is possible with previous solutions, in which a frame part of a comparable clamping frame is still part of the actual device.

If the lower tool has a first mold half or a laminating shell part, laminating slide elements or the like, and the upper tool has a second mold half or a carrier part receptacle, in particular, the carrier part to be laminated can be introduced with the carrier part receptacle from above into the draping room and/or the draping frame, so that, for example, the robot device described above can be used very well.

If the lower tool has a first mold half or a carrier part receptacle, and the upper tool has a second mold half or a laminating shell part, laminating slide element or the like, the carrier part to be laminated can, alternatively, for example, from below, or from the side into the draping room and/or the draping frame.

In order to be able to control or regulate in particular the individual grippers, devices or the like on the device, it is advantageous if the device has a regulating and/or control device, by means of which, in particular, the grippers for gripping the film element can be individually controlled.

In particular, it is advantageous if a tensile force measuring device is provided for measuring tensile forces acting between the film element and the gripper. This allows the grippers to be controlled very precisely. Such a tensile force measuring device can also be part of the regulating and/or control device.

According to a tenth aspect, the aim of the invention is achieved by a device for forming and/or laminating a film element with a frame part comprising a plurality of grippers and with a forming tool or a laminating tool comprising a lower tool and an upper tool, wherein the device comprises tensile force measuring means by means of which tensile forces acting between the film element and the grippers can be measured and monitored.

By means of such tensile force measuring devices, the risk of critical film elongation is reduced particularly effectively. In particular, it is possible to control undesired tension or film elongation on a film element gripped by the grippers.

It is understood that such tensile force measuring devices can be measured in different ways. For example, tensile forces can be measured simply by means of strain gauges, to name just one example. Such strain gauges can be arranged on the gripper head part, for example.

According to an eleventh aspect of the invention, the present task is performed by a device for forming and/or laminating a film element to a carrier part to be laminated, the device comprises a device for edge folding the film element laminated to the support part. If the device is equipped with a device for edge folding over, a production process for a laminated component can also be further streamlined and optimized.

In addition, it is advantageous in this context if bent means of the device for edge folding to a gripper for gripping the film element, in particular the gripper chassis thereof, gripper head part and/or gripper jaw elements, and/or on a draping frame for forming and/or laminating a film element, and/or on another frame or frame part of the laminating station. This results in a variety of design options.

It is also advantageous if bent means of the device for edge folding comprise at least one bent slide element for edge folding the film element or the like, whereby the bent means can be provided in a structurally simple manner.

The invention can be implemented in a structurally very simple manner if the bent means comprise at least one bent slide element for transferring the film element or the like.

According to a twelfth aspect of the invention, the present problem is also solved by a device for laminating a film element on a carrier part, comprising grippers for gripping the film element, with a carrier part receptacle for holding the carrier part relative to the film element and with a laminating room in which the film element is laminated onto the carrier part, The device comprises an insertion device for introducing the carrier part receptacle and/or the carrier part into the laminating room, and wherein the insertion device has at least two degrees of freedom in the room, in particular in the laminating room.

By means of the insertion device having at least two degrees of freedom, the film element and the carrier part, which must be connected to one another, can be positioned significantly better and more differentiated from one another, in particular in some areas and in particular within a laminating room or draping room.

In this context, it is advantageous if the insertion device comprises a multi-axially movable manipulator in particular a manipulator which can be moved in several axes within a laminating room or a draping room.

In the context of the invention, the term "manipulator" describes a device by means of which a robot or a robot device interacts physically with its environment and by means of which mechanical work can be performed automatically. In particular, such a manipulator comprises a multi-articulated robot arm part, by means of which multi-axial movements in room are possible.

The device can be built even more effectively if the insertion device is a discharge device for discharging the laminated component. As already described above, it is thus possible to handle both a carrier part to be laminated and a laminated carrier part or component in a structurally and procedurally simple manner.

In order that the device can also be used for press lamination without any problems, it is particularly useful if the device is characterized by a press tool having a first tool half and a second tool half, the first half of the tool comprises the insertion device, in particular the multi-axially movable manipulator.

Preferably, the first half of the tool is designed as an upper tool, so that a carrier part can be introduced from above into a draping room or laminating room by means of the insertion device.

Accordingly, the second tool half is accordingly designed as a lower tool, which then comprises a mold shell part or the like.

Preferably, the device comprises a lifting device for the second tool half, by means of which the mold shell part or the like can be pressed against the carrier part receptacle of the insertion device.

It is advantageous if the insertion device comprises an additional supporting device for absorbing pressing forces, in order to be able to withstand higher pressing forces in this respect by the multi-axial insertion device without damage.

Such a support device can in particular relieve the pressure on the manipulator, so that it can be dimensioned as "normal", but can nevertheless withstand high pressing forces without being damaged.

For this purpose, it is advantageous if the manipulator has an interface to a pressing force discharge device, such as a hydraulic cylinder ram or the like.

According to a thirteenth aspect, the aim of the invention is achieved by a device for forming and/or laminating a film element on a carrier part, having grippers for gripping the film element, with a carrier part receptacle for holding the carrier part relative to the film element and with a laminating room in which the film element is laminated onto the carrier part, wherein the device has a punching device for punching the film element. As the punching device is directly integrated in the laminating device, the finished laminated component can be immediately removed from excess film residue material in the laminating device, which allows the manufacturing process of laminated components to be streamlined even further.

In particular, an additional punching station or the like can be dispensed with in a correspondingly equipped system for producing laminated components.

In the context of the invention, the term "punching device" describes any device by means of which residual film material can be separated and removed from the laminated film element. In this respect, it does not matter whether the film element is punched, cut and/or torn, or the like.

An advantageous embodiment in this respect provides that the punching device has a segmented punching knife having a plurality of punching knife segments. By means of such punching knife segments, a separating process can be carried out successively on a film element, whereby a reduction of punching forces acting in the laminating device can also be advantageously achieved. This is particularly advantageous if the laminated component is held by a manipulator, since less manpower or punching forces act on the manipulator. Thus, this can be less massive.

In addition, different component geometries can be reproduced more easily with a segmented punching knife, so that a segmented punching knife can be used for different laminated components, which can further reduce overall production costs.

The device can be particularly compact if the punching device can be arranged within the laminating room, in particular within a draping room and in particular within a draping frame.

The device can be realized even more compactly if the punching device is arranged within a sealing device of a pressure differential device of the device.

If the punching device is arranged within a vacuum room of a pressure difference device of the device, residue film material can be removed immediately after a laminating process in the laminating device.

If the punching device is arranged opposite a carrier part receptacle for receiving a carrier part to be laminated, the punching device or the individual punching knife segments thereof can be placed, for example, directly next to a molded shell part or the like.

According to a fourteenth aspect, the aim of the invention is achieved by a device for forming and/or laminating a film element on a carrier part, having grippers for gripping the film element, having a carrier part receptacle for holding the carrier part relative to the film element, having a laminating room in which the film element is laminated onto the carrier part, and with a pressure differential device for generating a vacuum, wherein the pressure differential device comprises a segmented sealing device for sealing vacuum regions having a plurality of sealing slide segments. By means of the segmented sealing device, a vacuum room on the laminating device can be gripped even tighter. This in turn has the positive effect of an additional material saving, since a sealing device can be arranged into the area of a edge folding film area of the film element. In this respect, even smaller bent sections or edge folding can be created on the laminated component.

Advantageously, the sealing slide segments are arranged in a row one behind the other such that the film element can be sealed in segments. In particular, a circumferential sealing device can thus be successively produced.

If the sealing slide segments are arranged around a punching device, the device can be implemented even more compactly.

A segmental sealing of a vacuum room can be improved in particular if the sealing slide segments can be individually controllable and movable.

According to a fifteenth aspect, the aim of the invention is achieved by a device for forming and/or laminating a film element on a carrier part, having grippers for gripping the film element, having a carrier part receptacle for holding the carrier part in relation to the film element, and having a laminating room in which the film element is laminated onto the carrier part, the device comprises a correction device for correcting partial position deviations of individual film element regions. The correction device can be used to correct position deviations which may have occurred after the film element has been positioned or unwound or applied with respect to the carrier part. This allows laminated components to be produced with even greater precision and quality. In particular, an otherwise produced scrap of bad parts can be significantly reduced.

Such position deviations can occur, in particular partially, on the film element.

An advantageous embodiment provides in this respect that the correction device has detection means for detecting partial position deviations. Such detection means can be implemented very simply in terms of construction, for example, by optical sensors. In a very simple embodiment, the correction device can be equipped with a camera which optically picks up the film element as an actual layer and compares it with a target layer of the film element relative to the carrier part.

Cumulatively or alternatively, it is advantageous if the correction device has detection means for detecting specially designed film element areas. In particular, position deviations of specially designed film element areas are extremely disturbing and therefore unacceptable. Such specially designed film element areas can, for example, be present with regard to a blind seam, a 3D seam, two-color film materials or the like and can be immediately visible, so that such a deviation in respect often leads directly to a reject part.

For example, an incorrect position of a blind seam is detected by optical detection means, wherein a control unit, for example, actuates and moves grippers which grip and hold the film element in such a way, that the blind seam is moved out of its incorrect position and into the correct position. The actual laminating process can then take place. If necessary, a manipulator which has a carrier part receptacle on which the carrier part is held can also be manipulated by the present correction device.

In any case, it is advantageous if the correction device has a control unit for controlling grippers and/or the carrier part receptacle, so that the position of the film element relative to the carrier part can be changed, at least in some areas, even before lamination.

According to a sixteenth aspect, the aim of the invention is achieved by a system for producing a molded and/or laminated component having an input side, having an output side, having at least one processing line between the input side and the output side, and with a device for forming and/or laminating a film element, wherein the system has a device according to one of the features described here.

If the system is equipped with a device according to the invention, in particular laminated components can be produced more effectively and cost-effectively.

The present problem is solved in particular by a system for producing a molded and/or laminated component having at least one processing line and having a device for forming and/or laminating a film element, wherein the system comprises a feed and/or insertion device for feeding and/or inserting a film element to grippers or in grippers of a draping frame of the device and/or an insertion device for inserting a carrier part to be laminated to a lower tool of the device, and/or removal and/or provision device for removing or providing a molded part or a laminated component from the device. Such a system can also ensure a very compact production, in particular of laminated components.

Suitable feeding and/or insertion devices, infeed devices, removal devices have been readily explained above.

According to the invention, a provision device is arranged to transfer a laminated component to a subsequent processing station of the system, in which the laminated component can then be further processed.

The system can be used to advantageously produce virtually any shaped and/or laminated components, such as automotive components, in particular instrument panels, interior door panels or the like.

The system can be constructed in a particularly simple manner if the insertion device and removal and/or provision device comprises a common robot device having a preferably multi-axial movable manipulator. In particular, if the system is configured accordingly, a removal device can immediately be embodied by means of a removal device for introducing carrier parts and a provision device for laminated components, in particular if the removal device is configured to grip and hold a carrier part on the designated B-side of the laminated component.

An advantageous embodiment provides that the system has a charging station for charging the device with film elements, wherein the charging station is connected upstream of the device inline in the processing line. By such a charging station, the degree of automation at the system can be further increased, whereby in particular laminated components can be produced more effectively.

A further advantageous embodiment provides that the system has an adhesive application station for applying adhesive to the film element, wherein the adhesive application station is connected upstream of the device inline in the processing line. As a result, the production, in particular of laminated components, can be further compressed in terms of space and time.

If the adhesive application station is connected inline in the processing line downstream of a charging station and/or upstream of a feeding and/or insertion device of the device, it is possible to place the film elements in an orderly manner on the processing line of the system in order to then precisely coat the film elements with adhesive using the adhesive application station. Advantageously, the dwell time of film elements prepared with adhesive can thus be reduced before they are further processed in the draping frame of the device.

The processing of the film element can be further streamlined if the system has a heating unit for heating the film element, wherein in particular the heating unit in a feed and/or inserting device for feeding and/or inserting a film element to grippers or into grippers of a draping frame of the device.

A further increase in the degree of automation can be achieved on the system if the system has a transfer station for transferring a molded part or a laminated component, wherein the transfer station is connected downstream of the device inline in the processing line and upstream of another processing station inline.

Furthermore, it is advantageous if the system comprises a discharge station for discharging a molded part or a laminated component, wherein the discharge station being connected downstream inline of the processing line of a trimming station and/or a punching station and/or a bent station, whereby the finished components can be automatically conveyed away from the upstream processing stations.

According to a seventeenth aspect, the problem is therefore also solved by a system for producing a molded and/or laminated component having an input side, having an output side, having at least one processing line between the input side and the output side, and having a device for forming and/or laminating a film element, wherein the device comprises a device for edge folding the film element that is mounted on the carrier part.

If the device combines a laminating and bent device, a separate bent station with a bent device can be dispensed with at the system, whereby the system can be built more compactly.

According to an eighteenth aspect, the aim of the invention is by a method for forming and/or laminating a film element, wherein the film element is inserted into open grippers and subsequently gripped by the grippers, and in which, furthermore, the film element is brought into operative contact with a molded part or with a carrier part to be laminated, wherein the film element is unwound and/or applied at least partially only to the contour of the molded part or the carrier part by means of grippers.

By means of the proposed process according to the invention, the film element can be brought into effective contact or first contact with the molded part or carrier part almost or preferably completely without tensile force or stress.

This is particularly advantageous with regard to three-dimensional designed carrier parts.

In other words, the film element is applied or unwound to the carrier part without tensile force or stress by means of interaction of the grippers and optionally by means of interaction of a carrier part receptacle, and only then the film element is permanently connected to the carrier part by applying compressive forces, as will be described below.

As a result, the film element is treated gently in a particularly material- and surface-friendly manner.

A tension-free or strain-free unwinding or attachment of the film element with the carrier part without strain can be applied to the carrier part, in particular depending on displacement parameters, force parameters, speed parameters and/or temperature parameters can be controlled.

If the film element is brought into operative contact with the molded part and/or carrier part by means of a gripper, bypassing stretching of the film element, the film element can then then be unwound at least partially, in particular by means of a draping frame, more precisely by means of grippers, without critical tensile forces on the surface of the carrier part to be laminated, in particular before the film element is laminated onto the carrier part with the aid of a differential pressure.

A particularly advantageous method variant provides that the film element reduces is placed on the molded part or carrier part at least partially without elongation and/or at least with reduced elongation with a partial film elongation of less than 10%, preferably of less than 5%, in particular before the film element is laminated onto the carrier part with the aid of a differential pressure. In this way, a critical film expansion can be avoided, in particular before the film element is finally laminated or applied to the carrier part.

In the sense of the invention, the terms "unwinding", "bringing into operative contact", "laying on", "applying" describe in each case the approach and connection of the film element to the molded part or carrier component before, in particular, the film element is laminated on by means of a further process step, for example by means of vacuum laminating or press laminating. So, at least for the time being, bypassing forces through vacuum or press laminating.

If the film element is at least partially applied to the molded part or the carrier part with a partial film expansion of less than 5%, a particularly high quality of the optics can be achieved, if this is necessary for particularly high-quality products.

If a maximum film elongation of more than 15% is not exceeded in any effective contact area between the film element and the molded part or the carrier part to be laminated, in particular in the longitudinal and transverse direction of the film element, the film element can be processed particularly gently on the corresponding device and, in addition, a desired appearance can be maintained on the film element.

In order to be able to process the film element constructively and also procedurally as described above, it is advantageous if grippers and, in particular, gripper jaw elements are thereof moved on and/or in a draping room, in particular of a draping frame, with up to seven degrees of freedom or more, in order to unwind and/or form the film element at least partially on the contour of the molded part or the carrier part.

The film element can already be treated particularly gently during insertion into the draping room or, in particular, into the draping frame if the film element is inserted into the opened grippers without tension.

The film element can be transferred to the grippers and inserted in an operationally reliable manner if grippers are moved to an insertion position before the film element is inserted, in which the film element is placed on a lower gripper jaw element of the respective gripper.

If the grippers are closed sequentially after the film element has been inserted, the risk of undesirable distortions or stresses on the film element can be reduced.

According to a nineteenth aspect, the aim of the invention is achieved by a method for forming and/or laminating a film element, wherein the film element is gripped by grippers, to bring it into operative contact with a molded part or a carrier part to be laminated, wherein tensile forces acting between the film element and the grippers are measured and monitored by means of tensile force measuring means, when the film element is brought into operative contact with the film element to be laminated.

By measuring the tensile forces acting between the film element and the grippers, the risk of critical film elongation is reduced cumulatively or, alternatively, particularly effectively. In particular, it is possible to check undesired stresses or film elongation on a film element gripped by the grippers. This is particularly advantageous for a three-dimensional carrier part.

A particularly advantageous method variant provides that tensile forces acting between the film element and the grippers are measured and monitored by means of tensile force measuring means, when the film element is wound and/or applied at least partially only to the contour of the molded part or the carrier part by means of grippers. This is also particularly advantageous for a three-dimensional carrier part. As a result, a particularly good preparation, in particular of a further coating process, is achieved even before the film element is, for example, laminated onto the carrier part by a vacuum.

For example, the grippers can be activated depending on the determined tensile forces and by the regulating and/or control device described above.

According to a twentieth aspect, the aim of the invention is achieved by a method for forming and/or laminating a film element, wherein the film element is gripped by grippers in order to bring it into operative contact with a molding or a carrier part to be laminated, the film element gripped by the grippers is heated before and/or during the molding of the film element gripped by the grippers onto the molded part or the support part to be laminated.

As a result, the film element itself can still be placed in a draping room or draping frame. Lamination room, especially in a draping frame, can be heated, even if it is already gripped by the grippers.

In this respect, the film element and, in particular, adhesive applied thereto, can be prepared for subsequent lamination. In particular, the film element can be released from tensions within the draping room or draping frame.

For example, suitable heating devices of a heating unit are positioned above and/or below the grippers arranged within a draping room or laminating room.

In this respect, a suitable method variant provides for a heating device above the grippers and/or a heating device below the grippers to be temporarily arranged in order to heat the film element gripped by the grippers.

In particular, such a heating device can also be displaced from the outside into a draping room or laminating room, in particular into a draping frame, if the film element is already gripped by the grippers.

According to a twenty-first aspect of the invention, the present problem is solved by the invention by a method for forming and/or laminating a film element, wherein the film element is gripped by grippers, in order to bring it into operative contact with a molded part or a carrier part to be laminated, wherein the method is characterized in that the film element is fed to the grippers by means of a feeding and/or insertion movement and the film element is heated during the feeding and/or insertion movement.

In other words, this means that the film element is heated while being moved in the direction of a draping room or laminating room, in particular a draping frame.

It is thus possible to heat the film element already during a feed movement, wherein corresponding heating devices of a heating unit are preferably moved at the film element speed along the feed and/or feed path.

A particular advantage here is that the feeding and/or insertion line does not have to be equipped with heating devices over the entire length of the feed and/or insertion line.

In addition, it is advantageous for at least one heating device to be moved transversely to a feed direction of a lower tool and/or an upper tool in order to heat the film element gripped by the grippers, especially in a draping room formulated by a draping frame. This makes it possible to insert the film element into the feeding and/or insertion section during or after loading and, if necessary, into a draping room laminating room or to be able to heat the draping frame almost continuously.

The present methods can be further optimized if a film element and/or a heating unit are moved relative to grippers and/or a draping frame, while a film element is formed into a molded part or laminated onto a carrier part. Here, a new film element can already be heated, while, for example, another film element is already placed on a carrier part.

If the film element is prestressed by means of the gripper only during and/or after heating at least partially free of condensation and/or at least reduced expansion with a partial film elongation of less than 10%, preferably less than 5%, lower tensile forces need to be absorbed by the film material in order to be prestretched.

The method can be carried out in a more energy-efficient manner if heating elements of a heating device are switched on depending on the size of the film element.

The method can be carried out in a more customer-specific manner if the film element has a first feed movement, in particular a vertical lifting movement, a lower tool and/or a feed movement, in particular a vertical lowering movement, of an upper tool to the molded part or the carrier part or is laminated.

Cumulatively, the support part can be advantageously approximated to the film element by means of an upper tool, in particular with a multi-axial movement.

If grippers are actively moved when a lower tool is moved to the film element gripped by the grippers in the feed direction of the lower tool and/or against the feed direction of the lower tool and/or transversely to the feed direction, film elongation can be avoided particularly effectively, especially when the grippers are moved depending on measured tensile forces.

A further increase in efficiency can be achieved if the film element is optionally bent at least partially around an edge of the carrier part by means of grippers after being laminated onto the carrier part. As a result, the film element can already be moved inside the draping frame.

Advantageously, the edge folding can thus be carried out at a time when the film element and/or the adhesive has even more thermal energy than at a later time.

Since this allows not only process-related advantages, but also production-related advantages to be achieved, for example, optical advantages of a bent section, the advantages of edge folding with grippers of the draping frame are advantageous even without the other features of the invention.

In this respect, it is advantageous if the film element is at least partially bent around the carrier part within the draping frame.

The laminated carrier part can be further processed as quickly as possible, if, after release by the grippers, the shaped film element or the carrier part laminated with the film element is provided for further processing by means of a removal device on at least one downstream processing device.

Such a processing machine can be, for example, a bent device, a punching device or the like. This allows the laminated carrier part to be further processed as quickly as possible.

According to a twenty-second aspect, the aim of the invention is achieved by a method for converting a device for forming and/or laminating a film element, in which, in order to convert the device to another product, a tool of the device is replaced, the upper tool pull and/or the lower tool of the tool being replaced, and in which, in addition to the upper and/or lower tool also a draping frame including gripper for gripping the film element is replaced.

The draping frame is a part of the tool temporarily used on the device and can be replaced together with the lower and/or upper tool if this is necessary during a product change. Thus, the corresponding device can be converted to a new product much faster than is possible with previous solutions, in which a framing part of a comparable clamping frame is still part of the actual device.

According to a twenty-third aspect, the aim of the invention is also achieved by a method for forming and/or laminating a film element on a carrier part, in which the film element and the carrier part are positioned with respect to one another for forming and/or laminating, wherein the carrier part is moved in a multi-axial manner in the room, in particular in a draping room and/or a laminating room, for positioning with respect to the film element.

As a result, the film element and the carrier part, which must be connected to one another, can be positioned significantly better and more differentiated from one another, in particular in some areas and in particular within a laminating room or draping room, in particular before lamination.

In this respect, it is advantageous if the carrier part is brought closer to the film element for positioning relative to the film element in a multi-axial manner in room, in particular in a draping room and/or a laminating room.

A further improvement in the handling of the film element and carrier part relative to each other can be achieved if the film element is gripped by grippers for positioning relative to the carrier part, wherein grippers are being moved multi-axial in room, in particular relative to the carrier part.

The carrier part can be moved multi-axially in room in different ways, for example by means of a tool table, which can be displaced translationally along two axes and on which the carrier part receptacle is clamped.

The carrier part holder and thus also the carrier part can be moved in room in a particularly flexible manner and can thereby be positioned relative to the film element if the carrier part is held by means of a manipulator that can be moved in a multi-axially movable manner and relative to the film element.

In this context, it is advantageous if a carrier part receptacle of a device for laminating a film element on a carrier part is moved multi-axially in room in room, in particular in a draping room and/or a laminating room.

According to a twenty-fourth aspect, the aim of the invention is further achieved by a method for producing a laminated component from a film element and a carrier part, in which the film element is laminated onto the carrier part on a laminating device, and in which the laminated component is subsequently removed from the laminating device and made available for further processing, the carrier part or the laminated component is held on the B side thereof by means of a removal device for removal from the laminating device.

Due to the fact that the carrier part or the laminated component is held exclusively on its B-side, the risk of damage to the A-side is considerably reduced and can ideally be completely eliminated.

In particular, a laminated component has an A-side (goods side) and a B-side (bad side).

The B-side is the back of the laminated component or the carrier part, which is no longer visible in the installed state of the laminated component and is therefore not completely laminated.

The A-side, on the other hand, defines the visible area in the installed state of the laminated component.

In this respect, it is advantageous for the laminated component to grip and hold on its B-side as exclusively as possible during its production process.

Thus, a preferred method variant provides that the carrier part or the laminated component is removed from the laminating device by means of the removal device, held on its B side, and is transferred to a subsequent processing station, held continuously on its B side, whereby the A side can be better protected.

A specific method variant advantageously provides that the carrier part or the laminated component held on the B side thereof is removed from the laminating station during transfer from the laminating device to a downstream processing station, in particular on a downstream bent device and/or during insertion into a processing position at the downstream processing station, in particular into a bent processing position at the downstream bent device, is held continuously by the removal device.

The handling process of the carrier part up to the laminated component can be further substantially simplified if the carrier part is gripped and held continuously only once by the removal device from its pick-up position, in particular from a carrier part magazine, which extends into a draping position and a laminating position of the laminating device and into a processing position of a downstream processing station, namely on his B-side.

In this respect, it is advantageous with regard to simple and gentle handling of the carrier part or the laminated component if the carrier part is held on its B side while the film element is being casted onto the carrier part.

All process steps have the advantage that a plurality of otherwise required transfer steps can be dispensed with.

Advantageously, the removal device is at the same time also the introduction device, wherein these two devices embody a common transfer device or transfer station, as already described above. This transfer station advantageously comprises a robot device with a with a multi-axially movable manipulator.

With the present invention, both a critical film material expansion can be prevented and a film consumption can be significantly reduced. Furthermore, the possibility of using highly precise film element blanks makes it possible to achieve a previously not yet possible degree of automation in devices for forming and/or laminating a film element and systems for producing a molded and/or laminated component.

Furthermore, film material consumption can be significantly further reduced if the film element is partially stretched more at designated areas of a laminated component that are not visible later than in designated visible areas of the laminated component.

It should also be mentioned here that the present invention can be applied to almost all complete laminating processes, such as press lamination, vacuum lamination, in-mold graining (IMG) or the like.

In this respect, it is advantageous if the film element is formed after unwinding on the carrier part or when it is laid on the carrier part by applying a differential pressure to the molded part or the carrier part to be laminated.

In the meaning of the invention, the term "differential pressure" describes a wide variety of pressurizations of the components involved, in particular of the film element, for example by means of a negative pressure or vacuum, whereby the film element can be brought into active contact exclusively or supporting the carrier part in a shaping manner.

Either cumulatively or alternatively, a corresponding pressurization can also be effected by pressing devices or the like.

In this respect, the invention disclosed here does not only comprise vacuum lamination, but also press lamination, or the like, if the invention or the constructive and process-related objects are appropriately designed.

This means that, in particular, the present device can have a vacuum device having a vacuum tool and/or a pressing device having a pressing tool as a differential pressure generating device.

By means of the invention proposed here, a mold or shape can be formed. Lamination of a film element can be carried out in a particularly flexible manner, since the invention provides almost unlimited setting and method options.

It is understood that features of the solutions described above or in the claims can also be combined, if necessary, in order to be able to implement advantages and effects correspondingly cumulatively in the present case.

In addition, further features, effects and advantages of the present invention are explained with reference to the accompanying drawing and the following description, in which a draping frame, a gripper, devices and equipment of the invention are illustrated and described by way of example.

Components which correspond at least substantially with respect to their function in the individual figures can be identified here with the same reference signs, whereby the components do not have to be numbered and explained in all figures.

BRIEF DESCRIPTION OF THE SEVERAL VIEWS OF THE DRAWINGS

FIG. 4 a schematic a view of a first test laminated component with a film elongation of less than 20%;

FIG. 5 schematically shows a detailed view of the first component from FIG. 4;

FIG. 6 schematically shows a view of a second test laminated component at a film elongation of less than 20%;

FIG. 7 schematically shows of a detailed view of the second component of FIG. 6;

FIG. 8 shows a schematic view of a third test laminated component at a film elongation of less than 20%;

FIG. 9 schematically shows a detailed view of the third component from FIG. 8;

FIG. 34 schematically a perspective partial view of a device for forming and/or laminating a film element on a carrier part with segmented punching knife segments and sealing slide segments.

DETAILED DESCRIPTION OF THE INVENTION

Figure 1:
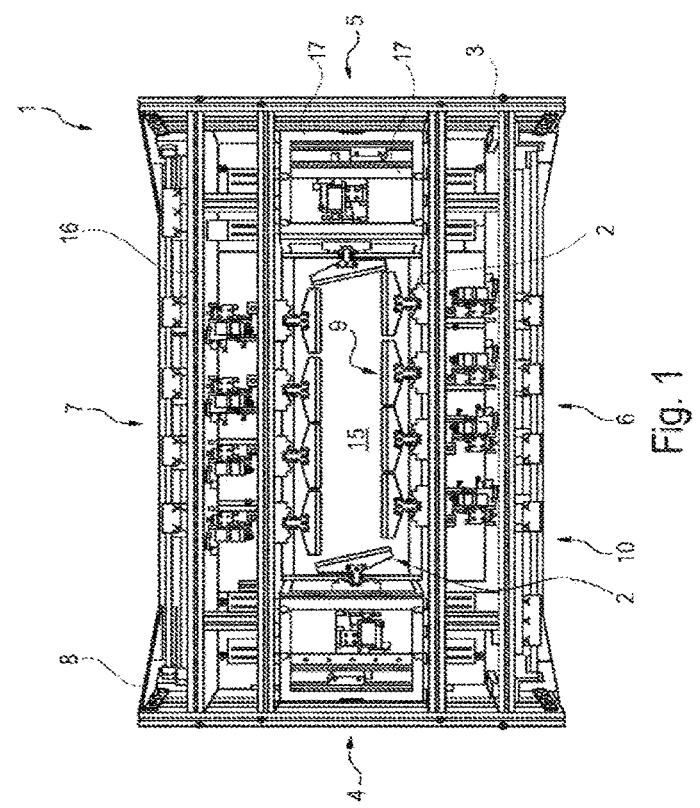
FIG. 1 schematically shows a top view of a draping frame with a total of ten grippers for gripping a film element, each of the grippers having seven degrees of freedom with respect to its gripper jaw elements relative to the draping frame.

According to FIG. 1, a draping frame 1 of the invention is shown as an example, which carries a plurality of motor-driven grippers 2.

The draping frame 1 has a frame part 3 which is converted to a housing 8 at least at its four page areas 4, 5, 6 and 7.

The draping frame 1 is at least partially open at the underside 9 or on the upper side 10.

More specifically, the housing 8 of the draping frame 1 is open above and below a centrally arranged draping room 15 of the draping frame 1, wherein the upper housing side is disassembled with regard to the representation according to FIG. 1, to allow a view of the frame part 3 and the grippers 2 mounted on it.

The frame part 3 of the draping frame 1 is characterized by some longitudinal traverses 16 (here only exemplarily quantified) and transverse traverses 17 (only exemplarily quantified), on which the grippers 2 are held within the draping frame 1.

In any case, the individual grippers 2 are each mounted on the draping frame 1 or in the draping room 15 in such a way that the grippers 2 contain at least seven degrees of freedom as a result of which a film element 20 (see exemplary FIG. 3) can be gripped in an extremely differentiated manner and draped and guided within the draping room 15.

Figure 10:
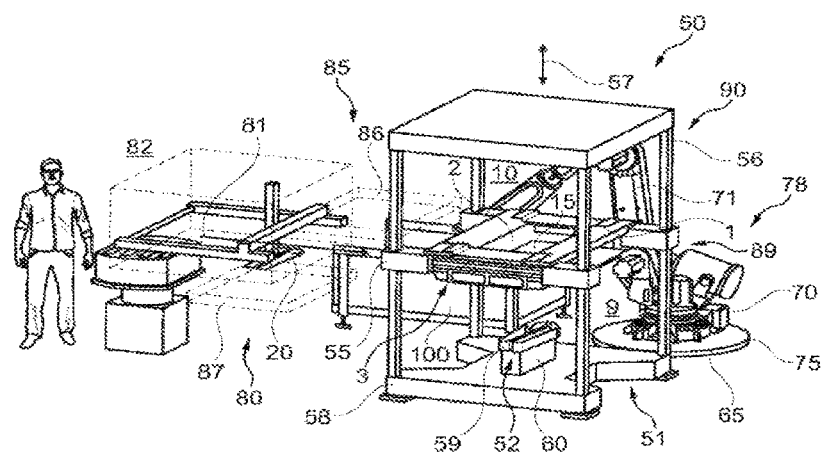
FIG. 10 schematically shows of a first perspective view of a first device for forming and/or laminating a film element with a draping frame, in which the film element is placed in a loading position on a lower heating device of a travelling heating unit.

The draping room 15 can be heated both from the underside 9 and from the upper side 10 by means of heating devices which can be displaced into the draping room 15 (not shown here, see for example from FIG. 10 onwards).

Such a heating device can basically be introduced into the draping frame 1 or the draping room 15 of each side areas 4, 5, 6 or 7, However, the front side region 6 or the rear side region 7 are preferred for this purpose.

Figure 2:
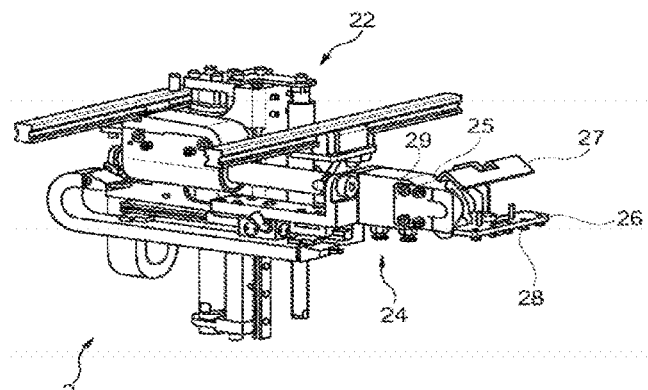
FIG. 2 schematically shows a perspective view of one of the grippers from FIG. 1.

According to FIG. 2, a gripper 2 of the draping frame 1 is shown as an example, wherein the gripper 2 has a gripper frame 22, on the front side of which a gripper head part 24 is arranged, on which the actual gripper jaw elements 25 and 26 of the gripper 2 are mounted.

Such a heating device can basically be introduced into the draping frame 1 or the draping room 15 of each side areas 4, 5, 6 or 7, however, the front side area 6 or the rear side area 7 are preferred for this purpose.

According to FIG. 2, a gripper 2 of the draping frame 1 is shown as an example, wherein the gripper 2 has a gripper chassis 22, on the front side of which a gripper head part 24 is arranged, on which the actual gripper jaw elements 25 and 26 of the gripper 2 are mounted.

While the gripper chassis 22 is mounted on the draping frame 1 with a total of 6 degrees of freedom, the gripper head part 25 has at least one additional degree of freedom with respect to the gripper chassis 22, so that in particular the gripper jaw elements 26 and 27 have at least 7 degrees of freedom in the draping room 15.

It is understood that in the given design of the construction, other degrees of freedom combinations between gripper chassis 22 and draping frame 1 are also possible in relation to the gripper head part 25 and the gripper chassis 22.

At least in this embodiment, the gripper head part 25 of the gripper 2 is three-dimensionally adjustable relative to the gripper chassis 22 of the gripper 2. The degrees of freedom achieved at the gripper head part 25 in this regard are different from the degrees of freedom of the gripper chassis.

A further special feature of the gripper 2 is that the gripper 2 has temperature-controlled gripper jaw elements 26 and 27, so that these gripper jaw elements 26 and 27 can adapt to special conditions or requirements in terms of temperature with regard to a film element 20 to be gripped by means of temperature-regulating means 28 which can be activated.

For example, it is extremely advantageous if at least one of the gripper jaw elements 26 or 27 can be cooled.

A cooled gripper jaw element 26 or 27 is particularly advantageous if the film element 20 is provided with adhesive for lamination on a carrier part 30 (see FIG. 3), since the cooled gripper jaw element 26 or 27 can form a less intensive bond with the adhesive, as a result of which the cooled gripper jaw element 26 or 27 is significantly less contaminated by the adhesive.

In this embodiment, in particular, the lower gripper jaw element 26 in particular temperature-controllable in the sense of cooling, since only this adhesive-containing side of the film element 20 comes into effective contact when this film element 20 is inserted into the gripper 2.

Furthermore, the gripper 2 is still equipped with tensile force measuring means 29, which are arranged on the gripper head part 25. Tensile forces acting between the film element 20 and the gripper 2 can be detected and measured by means of the tensile force measuring means 29. According to the invention, the gripper 2 can then be moved in the draping room 15 and in relation to the film element 20 as a function of the determined tensile forces in order to avoid critical film stretching in the sense of the invention.

Figure 3:
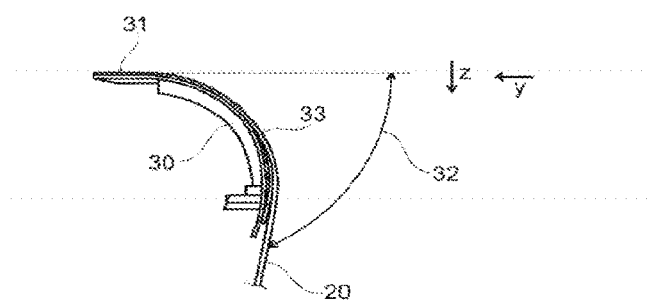
FIG. 3 schematically shows an example of a winding of a film element on a carrier part to be laminated.

According to the illustration in FIG. 3, it is shown, for example, how it is possible with the gripper 2, which is movable multi-axially in room, in particular in areas of the carrier part 30 without undercuts, to unwind the film element 20 merely at the contour 31 of the carrier part 30.

Preferably, the film element 20 is even completely unwound without tensile force on the contour 31 of the carrier part 30, such that on the one hand the film element 20 can be laminated in a manner that is particularly gentle on the material and the surface. On the other hand, the grippers 2 with their seven degrees of freedom can apply the film element 20 to the carrier part 30 to be laminated almost without stretching or at least with reduced stretching.

According to the simplified illustration in FIG. 3, in particular the gripper head part 25 of the gripper and in particular the gripper jaw elements 26 and 27 pass through an approach curve 32, to unwind the film element 20 in the simplest case by moving the gripper 2 in the Z- and Y-direction onto the carrier part in the sense of the invention without tensile force.

It is particularly advantageous if the film element 20 can be brought into operative contact with the carrier part 25 to be laminated, at least by means of some of the grippers 2, bypassing an extension or stretching of the film element 20, so that the film element 20 can stretch only very slightly, if at all, at least when it is applied to the carrier part 30 to be laminated with the grippers 2, so that even after laminating the film element 20 on the carrier part 30 on its visible surface there is hardly any distortion.

This is particularly advantageous for sensitive, visible surfaces 33 or for surfaces which have a structure, for example.

For this purpose, according to the illustrations shown in FIGS. 4 to 9, three examples of laminated carrier parts 30 from the automotive sector are shown, on whose visible surfaces 33 an example grid 35 is applied.

On the basis of the grid 35, it is easy to see that in all automotive components 37, 38 and 39, despite bends and partially existing free-form contours, hardly any distortions of the grid 35 result. Rather, the film expansion is partially limited to 10% to 15%.

A first embodiment example of an advantageous device 50 for forming and/or laminating a film element 20 onto a carrier part 30 is exemplarily shown according to the illustrations in FIGS. 10 to 19 and explained here, where, on the basis of the individual FIGS. 10 to 19, different method steps on the device 50 are shown as examples.

The basic concept of the device 50 is also relevant for the further embodiment examples. In this respect, the device 50 is also described by way of example for the further embodiments in order to avoid repetitions overall.

The device 50 is primarily characterized by a frame part 3 of a laminating tool 51, which in this embodiment comprises a draping frame 1 having a plurality of motor-driven grippers 2.

Figure 15:
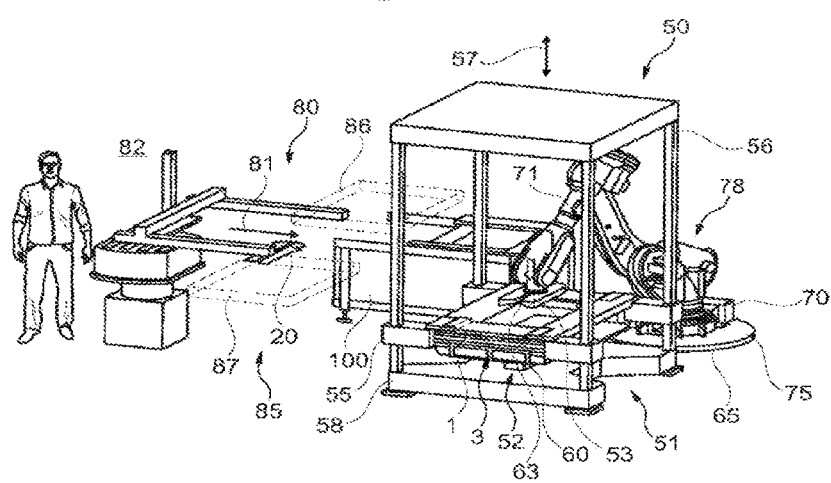
FIG. 15 schematically shows a sixth perspective view of the first device from FIGS. 10 to 14 with a draping frame lowered in the direction of a lower tool and an upper tool arranged on a robot via the draping frame with a carrier part receptacle, which holds the carrier part.

The device 50 is further characterized by further components of the laminating tool 51, which substantially comprise a lower tool 52 and an upper tool 53 (see in particular also FIG. 15).

The draping frame 1 and thus also the grippers 2 are mounted in a frame 56 of the device 50 in a height-adjustable manner by means of a displacement mechanism 55, so that the entire draping frame 1 is mounted on the frame 56 in a height-adjustable manner along a vertical displacement axis 57 of the device 50.

The lower tool 52 is placed below the draping frame 1 on a base part 58 of the frame 56, wherein the lower tool 52 comprises one or more mold shell parts 59, which in turn are arranged on a base 60 of the base part 58.

The upper tool 53, on the other hand, comprises a carrier part receptacle 63, by means of which one or more carrier parts 30 to be laminated can be introduced automatically, in particular into the draping frame 1 of the device 50.

In order to automate the insertion of the respective carrier part 30, a corresponding insertion device 65 is provided on the device 50, which in this embodiment comprises a robot device 70 having a multi-axial movable manipulator 71.

This robot device 70 with its multi-axial movable manipulator 71 is not only used to introduce the carrier part 30 to be laminated into the device 50, in particular into the draping room 15 of the draping frame 1, but moreover also to remove the finished laminated component 37, 38 or 39 (see FIGS. 4 to 9), so that the robot device 70 immediately also represents a removal device 75 on the device 50.

Overall, the robot device 70 can be regarded as a common transfer station 78 for the device 50 on the one hand and as a removal device 75 on the other hand due to its dual function as an insertion device 65.

Furthermore, the device 50 also has a feeding and/or inserting device 80 by means of which one or more film elements 20 can be fed into the draping frame 1, in such a way that the film element 20 can be immediately inserted into opened grippers 2, in particular onto the lower gripper jaw elements 26 of the open gripper 2.

For this purpose, the feeding and/or inserting device 80 has a feeding and/or inserting section 81 along which the respective film element 20 can be conveyed from a loading position 82 to the draping room 15.

In this case, the feeding and/or inserting device 80 or its feeding and/or inserting section 81 runs transversely to the vertical displacement axis 57 of the device 50.

Conversely, this means that the draping frame 1 is arranged such that it can be displaced transversely to said feeding and/or inserting section 81 by means of the displacement mechanism 55.

In this first embodiment, the feeding and/or inserting device 80 is characterized in particular by at least one movable heating unit 85 for heating the respective film element 20 outside the draping room 15 of the draping frame 1, which has two heating devices 86 and 87.

Here, the heating unit 85 is integrated into the feeding and/or inserting device 80 in such a way that the heating unit 85 can be continuously moved together with the respective film element 20, which can be continuously moved along the feeding and/or insertion section 81 in the direction of draping room 15 of draping frame 1.

In this embodiment, the upper heating device 86 and the lower heating device 87 of the heating unit 85 are moved together with the film element 20 along the feeding and/or insertion section 81, so that the respective film element 20 can be heated continuously both from above and from below.

In particular, the lower heating device 87 is designed in such a way that the respective film element 20 can be transported from the loading position 82 to the draping frame 1 of the device 50 by means of said lower heating device 87.

According to FIG. 10, a film element 20 is already placed on the lower heating device 87 and is located on the way to the draping frame 1 by means of the movable heating unit 85 from the loading position 82.

While the film element 20 is now heated on both sides by means of the upper heating device 86 and the lower heating device 87, it is simultaneously transported along the feeding and/or insertion section 81 together with the heating devices 86 and 87.

The draping frame 1 is located in a feeding position 89 in which the film element 20 transported by means of the feeding and/or inserting device 80 can be transported to the draping room 15.

Here, the robot device 70 is still in a starting position 90, in which at least one carrier part 30 to be laminated is received in the carrier part receptacle 63, namely from a carrier part magazine 100.

Figure 11:
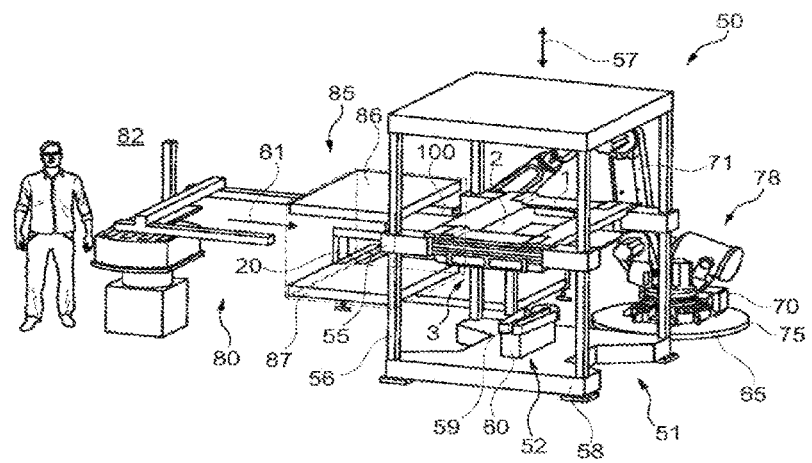
FIG. 11 schematically shows a second perspective view of the first device from FIG. 10 with the heating unit moving along with the film element.

According to FIG. 11, the heating unit 85 with the film element 20 is located shortly before being fed or inserted into the draping frame 1.

Figure 12:
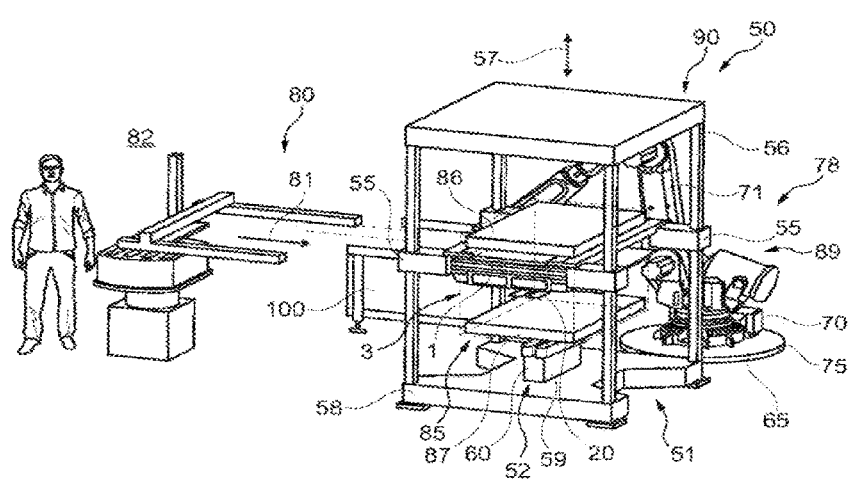
FIG. 12 schematically shows a third perspective view of the first device from FIGS. 10 and 11 with the retracted heating unit, which is now arranged congruently with the draping frame.

According to FIG. 12, the heating unit 85, together with the film element 20 heated therewith, is completely retracted into the device 50.

Figure 13:
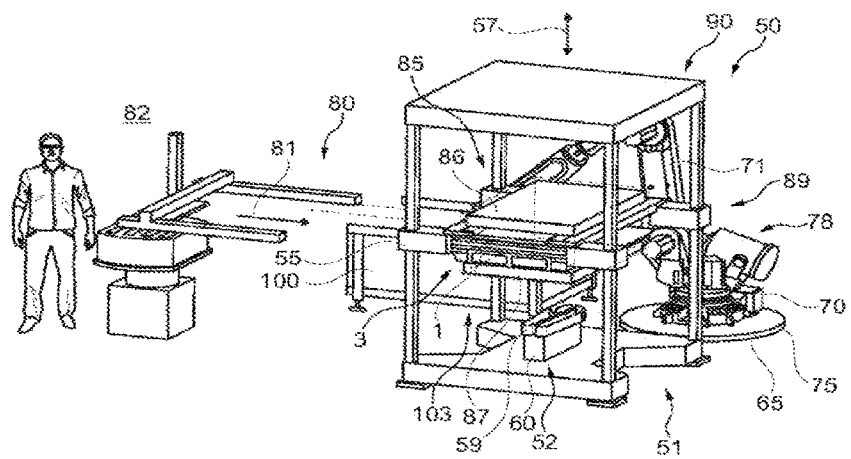
FIG. 13 schematically shows a fourth perspective view of the first device from FIGS. 10 to 12 with a lower heating device moving upwards for transferring the film element to grippers of the draping frame.
Figure 14:
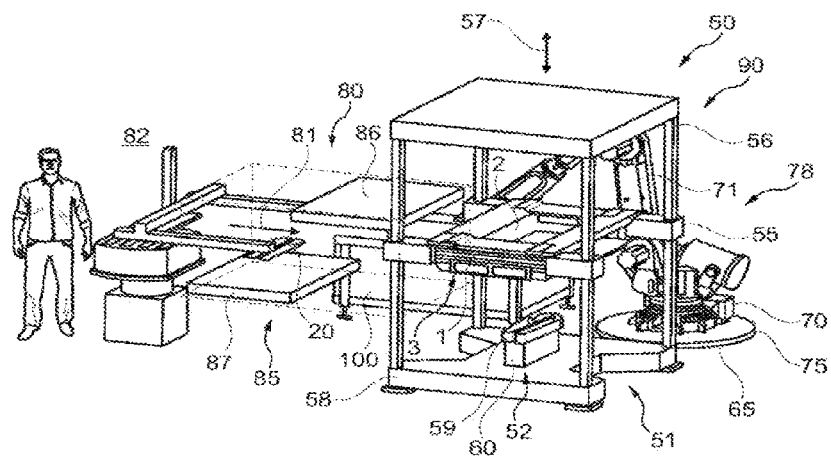
FIG. 14 schematically shows a fifth perspective view of the first device from FIGS. 10 to 13 with a heating unit moving back into the loading position.

As shown in FIG. 13, the lower heating device 87 moves upwards towards the draping frame 1, so that in this insertion position 103 the heated film element 20 can be transferred to the gripper 2 of the draping frame 1 or inserted into said grippers 2.

As soon as an adjustable target temperature is reached at the film element 20 or in the draping room 15, the heating unit 85 and its heating devices 86 and 87 return to the loading position 82 in order to accommodate one or more new film elements 20.

According to FIG. 15, the draping frame 1 with the film element 20 draped therein now moves downwards towards the lower tool 52, in the meantime, the carrier part 30 located on the carrier part receptacle 63 is positioned above the draping room 15 of the draping frame 1 by means of the manipulator 71 of the robot device 70.

Figure 16:
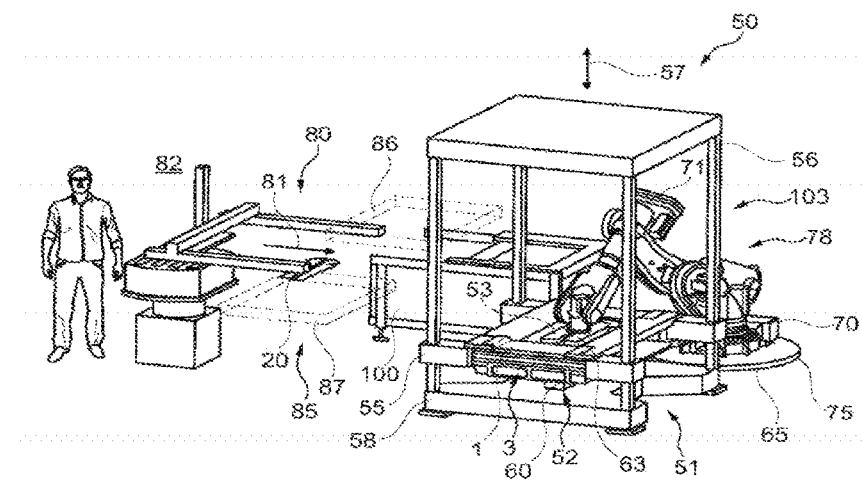
FIG. 16 schematically shows a seventh perspective view of the first device from FIGS. 10 to 15 with a carrier part lowered onto the film element by means of the robot.
Figure 17:
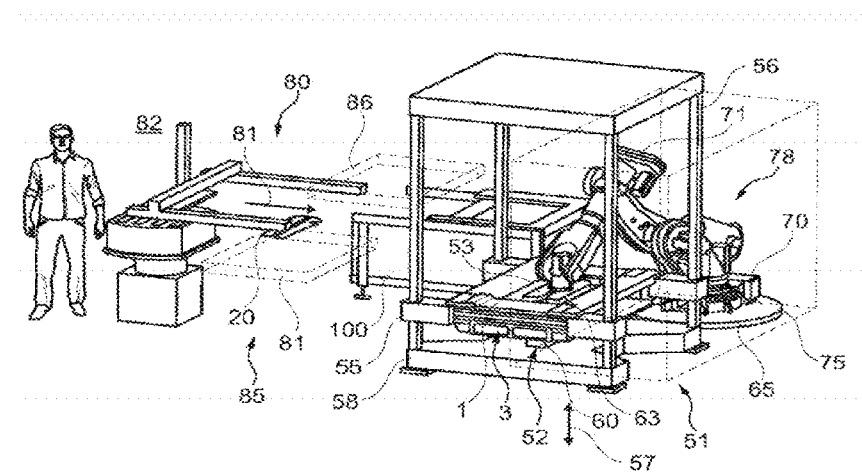
FIG. 17 schematically shows an eighth perspective view of the first device from FIGS. 10 to 16 in a laminating position.
Figure 18:
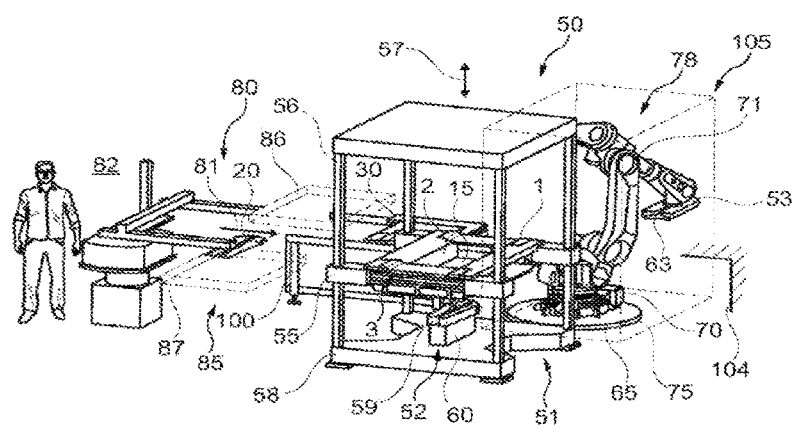
FIG. 18 schematically shows a ninth perspective view of the first device from FIGS. 10 to 17 after the laminating process, wherein the laminated carrier part is transferred by means of the robot to a device for cutting the laminated carrier part.

According to the illustration in FIG. 16, the carrier part 30 to be laminated is now further transferred to the film element 20 by means of the manipulator 71 of the robot device 70, so that according to the representation according to FIG. 17, the actual vacuum laminating process is finally carried out on the device 50.

After the carrier part 30 has been successfully laminated with the film element 20, the robot device 70 removes the finished laminated component 37, 38 or 39 from the draping frame 1 and places it in a preferably cooled trimming station 104 (indicated only as an example in FIG. 18), wherein the robot device 70 is in a provision position 105 in which it provides the finished laminated component 37, 38 or 39 for further processing or the like on the device 50.

Figure 19:
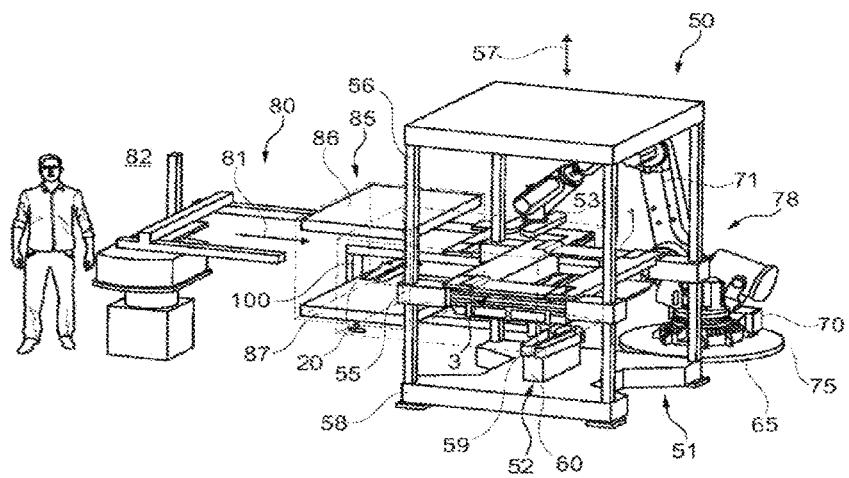
FIG. 19 schematically shows a tenth perspective view of the first device from FIGS. 10 to 18 with the heating unit which is heated and which is supported by the film element, in which the robot picks up a new carrier part.

According to FIG. 19, the manipulator 71 of the robot device 70 approaches the carrier part receptacle 63 again to the carrier part magazine 102 in order to pick up the carrier part 30 to be laminated again.

At the same time, for a new lamination process, a new film element 20 is transported along the feeding and/or inserting section 81 in the direction of draping frame 1 by means of the feeding and/or inserting device 80, which is simultaneously heated on both sides by means of the heating unit 85.

Figure 20:
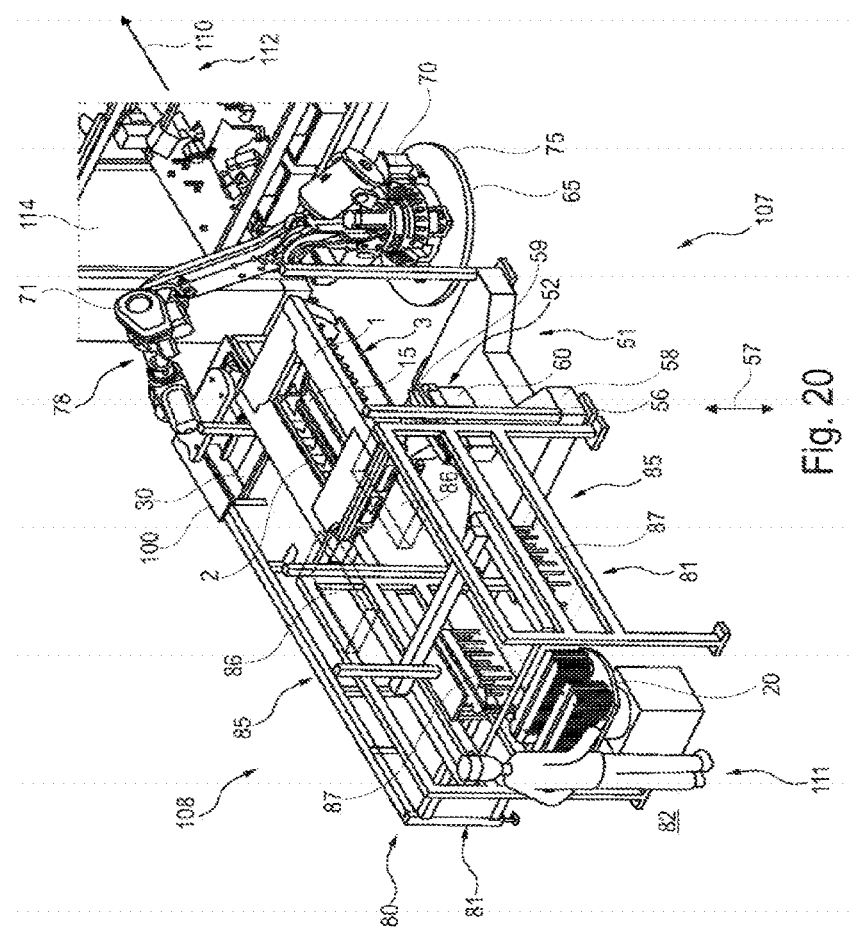
FIG. 20 schematically shows a perspective view of a first system for producing a molded and/or laminated component with a device for forming and/or laminating a film element onto a carrier part and with a punching and bent station connected inline downstream as well as a discharge station connected inline downstream.

According to FIG. 20, a first plant design example with a first system 107 for producing a molded and/or laminated component 37, 38 or 39 is shown, wherein the first system 107 is an alternative, respectively, the second device 108 for forming and/or laminating a film element 20. More precisely, the second device 108 is integrated in the processing line 110 of the first system 107, wherein a punching and bent station 114, which is not shown further, is connected to the second device 108 inline of the processing line 110.

The processing line 110 runs from an input side 111 of the first system 107 to an output side 112 of the first system 107.

The second device 108 has substantially the same structure as the previously described device 50 from the FIGS. 10 to 19, and the device 108 comprises the draping frame 1 with the moto-driven grippers 2 movably arranged thereon for gripping the film element 20, the feeding and/or inserting device 80 as well as the removal device 85 with the robot device 70 and the carrier part magazine 100.

In this first plant embodiment, however, the device 108 comprises two heating units 85 on the feeding and/or inserting device 80 thereof, whereby the cycle times on the alternative device 108 or on the system 107 can be advantageously reduced. For example, the cycle times can be less than 40 seconds.

In any case, the film elements 20 are inserted alternately from the respective heating unit 85 into the draping frame 1.

After the respective film element 20 has been laminated onto the carrier part 30, the respective finished laminated component 37, 38 or 39 (see FIGS. 4 to 9) are transferred by the robot device 70 to the inline downstream and bent station 114, where they are stored for further processing.

Apart from the two heating units 85, the alternative device 108 otherwise has the same structure as the device 50 described in FIGS. 10 to 19, so that reference is made to the description of the device 50 with regard to a more detailed structure and operation of the alternative device 108.

Figure 21:
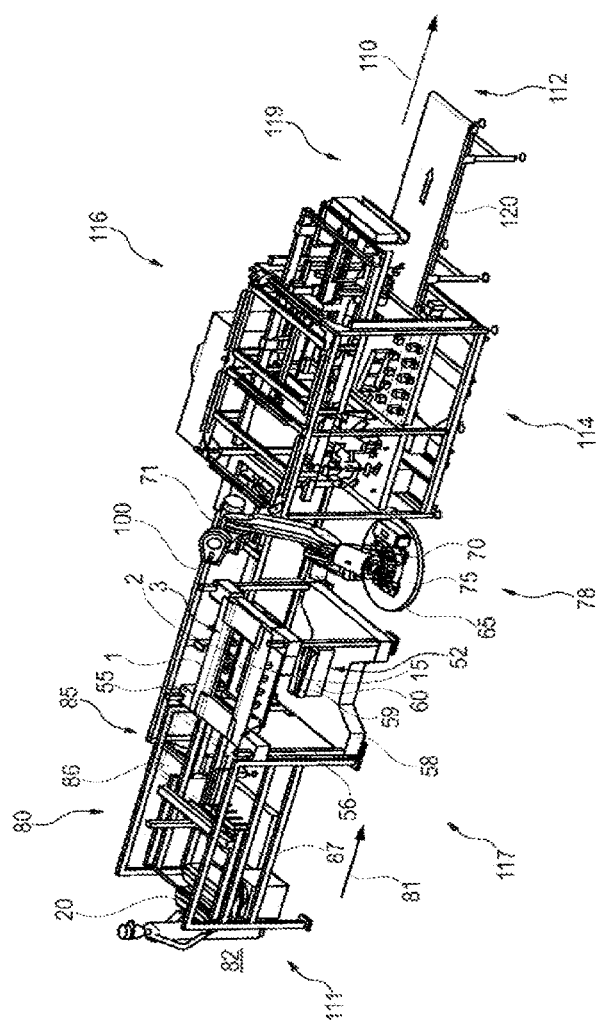
FIG. 21 schematically shows a perspective view of a second system for producing a molded and/or laminated component with a device for forming and/or laminating a film element onto a carrier part and with an inline downstream punching and bent device.

In the second embodiment shown in FIG. 21, a second System 116 for producing a molded part or laminated part 37, 38 is shown, in relation to 39, with a processing line 110.

A third device 117 for forming and/or laminating a film element 20 and a punching and bent station 114 connected downstream of said device 117 are arranged in said processing line 110, at which an additional discharge station 119 for discharging finished laminated components 37, 38 and 39 (see FIGS. 4 to 9) with a discharge table 120 is connected inline with processing line 110. The discharge station 119 achieves a higher degree of automation at the second System 116.

The third device 117 also has essentially the same structure as the previously described device 50 from the FIGS. 10 to 19, and the third device 107 accordingly comprises the draping frame 1 with the arranged motor-driven grippers 2 for gripping the film element 20, the feeding and/or inserting device 80 as well as the removal device 85 with the robot device 70 and the carrier part magazine 100.

Figure 22:
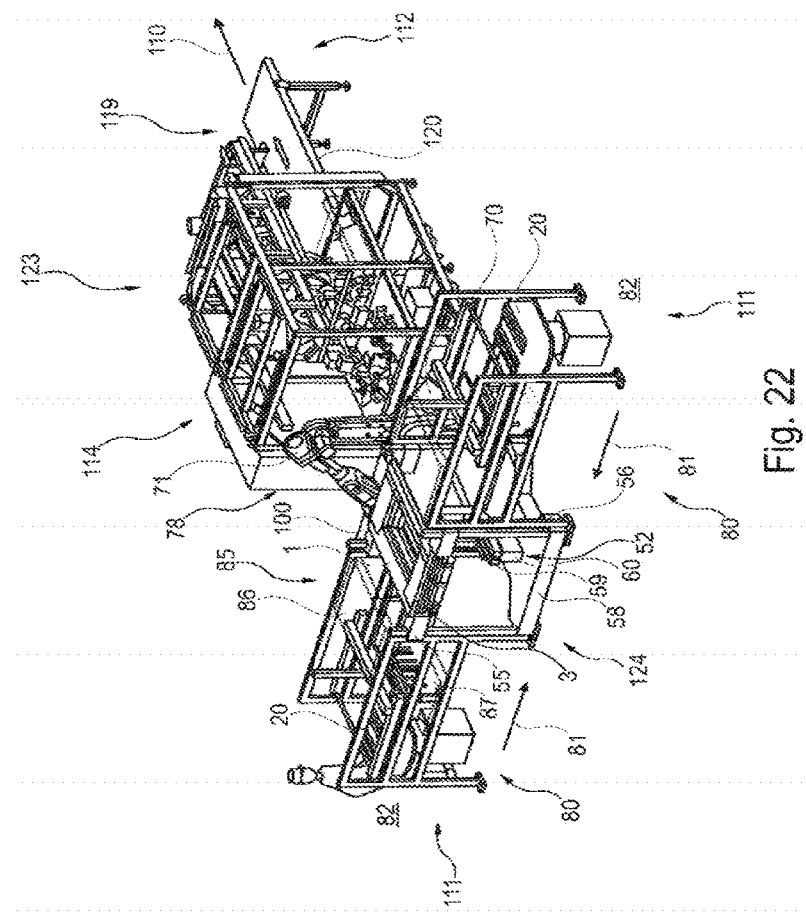
FIG. 22 schematically shows a perspective view of a third system for producing a molded and/or laminated component with a device for forming and/or laminating a film element onto a carrier part comprising two heating units for shortening the cycle time, and with a punching and bent device connected inline downstream.

A third system design example shows FIG. 22, in which a third System 123 in its processing line 110 has two feeding and/or inserting devices 80 of a fourth device 124 for forming and/or laminating the film element 20. The fourth device 124 accordingly also has two heating units 85, so that here again an advantageous cycle time reduction can be achieved.

This fourth device 124 has substantially the same structure as the device 50 from FIGS. 10 to 19 described above. In this respect, the fourth device 124 has the draping frame 1 with the motor-driven grippers 2 which are arranged movably thereon and which grip the film element 20, feeding and/or inserting devices 80 in two forms and the removal device 85 with the robot device 70 as well as the carrier part magazine 100.

The punching and bent station 114 and the discharge station 119 for discharging finished laminated components 37, 38 and 39 (see FIGS. 4 to 9) are then connected inline downstream of the fourth device 124.

Figure 23:
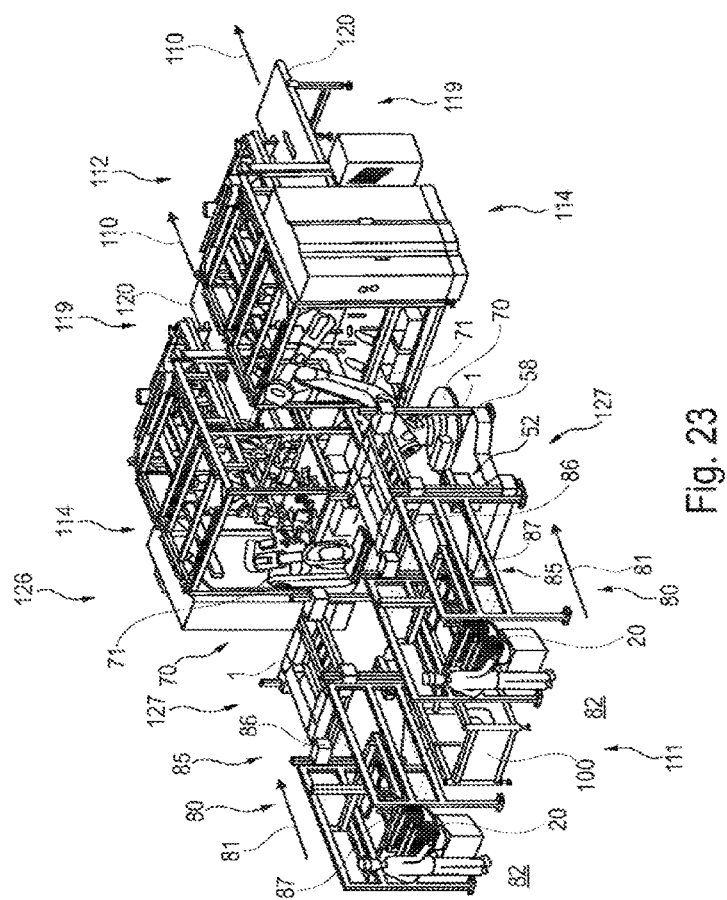
FIG. 23 schematically shows a perspective view of a double line for manufacturing a molded and/or laminated component with two devices for forming and/or laminating a film element on a carrier part and with punching and bent devices connected inline downstream.

According to FIG. 23, a fourth example of a system design with regard to a double system 126 for producing a molded part or a laminated component with two processing lines 110, wherein at the double system 126 all machines are duplicated.

For example, the double system 126 has two fifth devices 127, wherein every fifth device 127 has the draping frame 1 with the motor-driven grippers 2 movably arranged thereon for gripping the film element 20, the feeding and/or inserting device 80 as well as the removal device 85 with the robot device 70 and the carrier part magazine 100.

Further, two punching and bent stations 114 and two discharge stations 119 are connected in line with the fifth devices 127 of the processing lines 110 at the double system 126, whereby the output rate can be doubled with in the double system 126.

Figure 24:
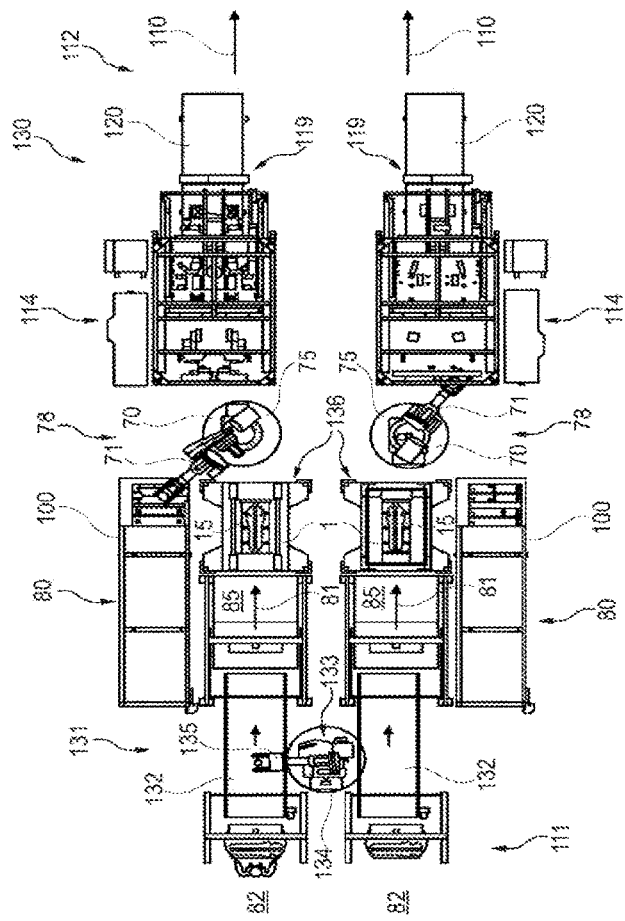
FIG. 24 schematically shows a top view of the double system shown in FIG. 23.
Figure 25:
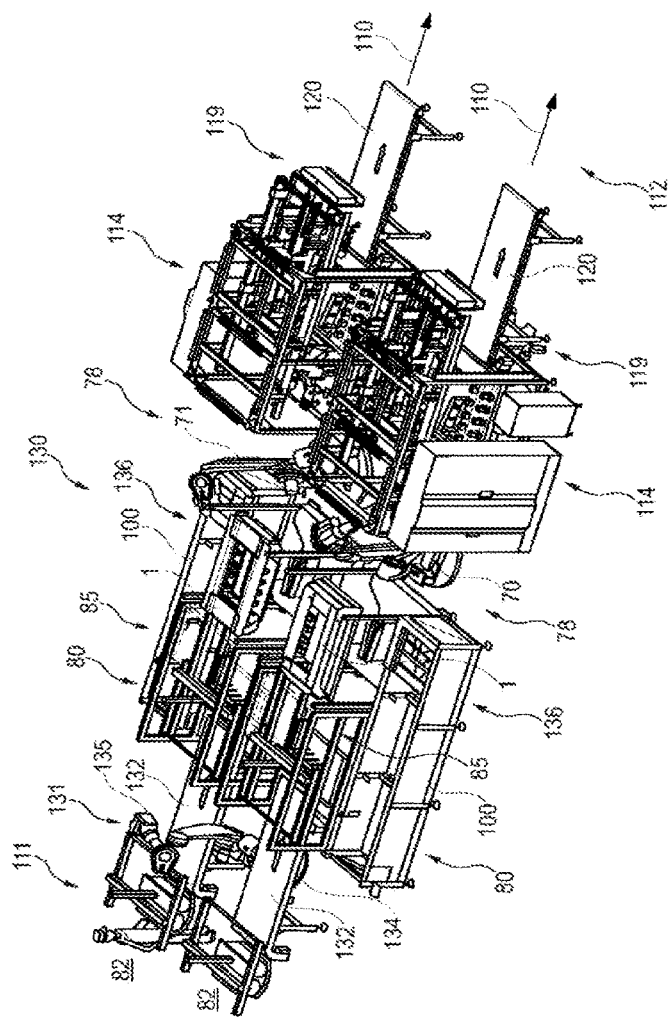
FIG. 25 schematically shows a perspective view of a further system for manufacturing a molded and/or laminated component with a device for forming and/or laminating a film element onto a carrier part, with an inline upstream adhesive application station and with an inline downstream punching and bent station; designed as a double system.

According to FIGS. 24 and 25, a further double system 130 for producing a molded part or a laminated component 37, 38 or 39 is shown.

This further double system 130 also has two processing lines 110, but has an adhesive application station 131 in addition to the first double system 126 from FIG. 23 at the input side 111 of the further double system 130.

Due to the two existing processing lines 110, two adhesive application lines 132 belong to this adhesive application station 131, whereby these two adhesive application lines 132 are operated by a common adhesive application device 133. For this purpose, the adhesive application device 133 is equipped with an adhesive application robot 134 having a corresponding application manipulator 135.

The adhesive application device 133 with its adhesive application robot 134 is arranged between the two adhesive application lines 132 of the adhesive application station 131, so that both adhesive application lines 132 can be reached unproblematic and operated by the adhesive application manipulator 135.

Two sixth devices 136 for forming and/or laminating a film element 20 are located downstream of the adhesive application station 131 in accordance with the two-fold processing lines 110. Here, too, the respective sixth device 136 comprises the feeding and/or inserting device 80 for feeding and/or inserting the film element 20 into the draping frame 1, wherein one in six devices 136 is assigned laterally to the carrier part magazine 100. Further, the sixth devices 136 each again comprise the removal device 75 in the form of the robot device 70.

The punching and bent station 114 is again connected downstream of the respective sixth device 136.

On the output side of the further double system 130, the discharge station 119 is again located on each processing line.

Figure 26:
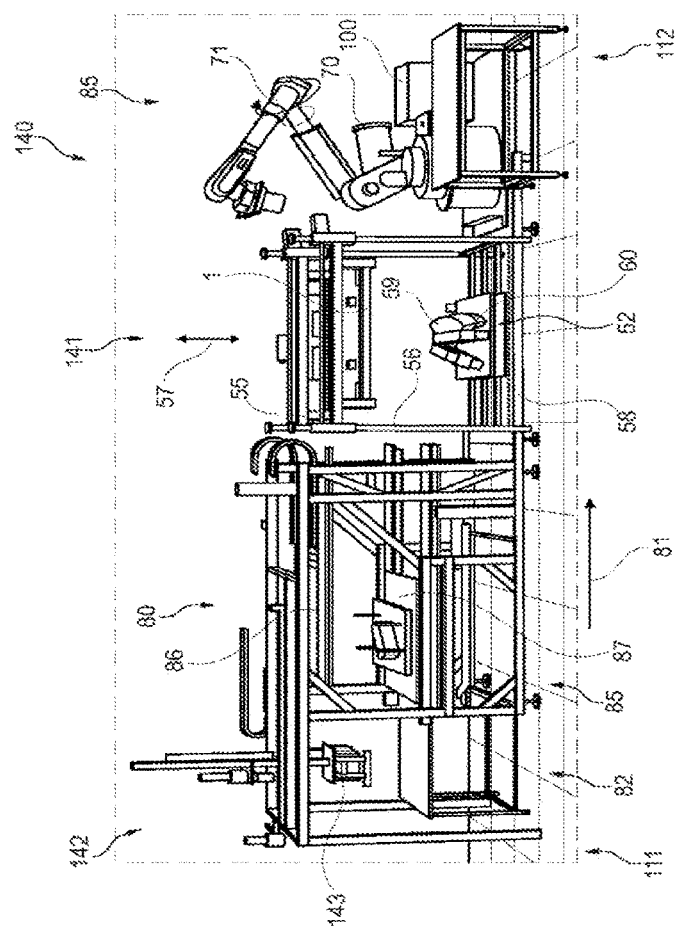
FIG. 26 schematically shows a side view of a device for forming and/or laminating a film element with a draping frame, wherein the device is equipped, for example, with a device for the automated loading of film elements.

According to FIG. 26, a fully automated system 140 for producing a molded part or a laminated component 37, 38 or 39 is shown, comprising a processing line 110 and a seventh device 141 for forming and/or laminating a molded element 20. This seventh device 141 again has substantially the same structure as the previously described device 50 of FIGS. 10 to 19.

The seventh device 141 accordingly comprises the draping frame 1 with the motor-driven grippers 2 movably arranged thereon for gripping the film element 20, the feeding and/or inserting device 80 as well as the removal device 85 with the robot device 70 and the carrier part magazine 100.

The fully automated system 140 also has a loading station 142 at its input side 111 for feeding the seventh device 141 for forming and/or laminating the molded element 20.

The loading station 141 has a gripping device 143 for receiving film elements 20 and depositing these film elements 20 on the feeding and/or inserting section 81.

By means of this loading station 141, film elements 20 can be transferred to the feeding and/or inserting section 81 of the feeding and/or inserting device 80 of the seventh device 141, as far as possible without operating personnel.

This allows the fully automated system 140 to operate with an even higher degree of automation.

It is understood that such a loading station 141 can also be connected upstream of all devices 50, 108, 117, 124, 127 and 136 described above, as well as of systems 111, 116, 123, 126 and 130, in order to save corresponding operating personnel there as well.

However, this loading station 142 is shown by way of example only with respect to the fully automated system 140.

Figure 27:
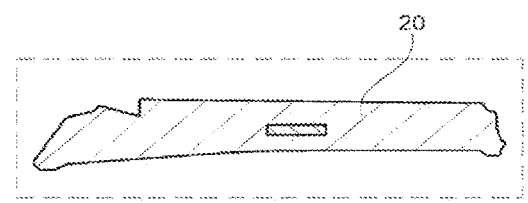
FIG. 27 shows a schematic top view of a prefabricated film element.
Figure 28:
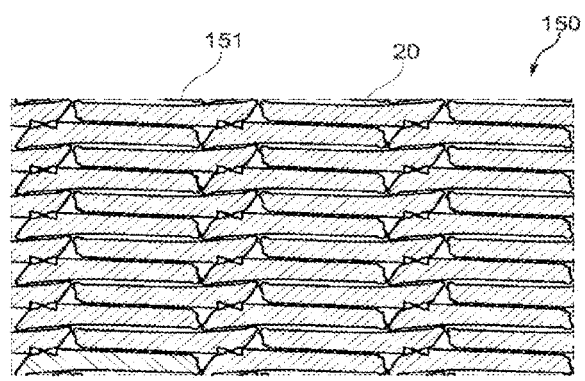
FIG. 28 schematically shows a top view of an optimized cutting pattern of a plurality of film elements.

According to FIG. 27, a pre-assembled film element 20, as may be used in the present invention, is schematically represented, while referring to FIG. 28, an optimized cutting pattern 150 is shown with a plurality of designated film elements 20.

These designated film elements 20 can be placed particularly close to each other and insofar with very little residual film grid material 151 in between on the optimized cutting pattern 150, since the film elements 20 cut out from this can only be gripped reliably by the grippers 2 according to the invention or the draping frame 1 according to the invention.

This is partly due to the fact that the grippers 2 according to the invention can be moved in the draping room 15 with seven degrees of freedom, due to the high degree of multi-axial freedom of movement.

According to the embodiments shown in FIGS. 29 to 32, the laminating device is respectively provided with a plurality of bent means 160 or bent slides shown, wherein the bent means 160 are provided at a draping room 15 of the device 1.

Figure 29:
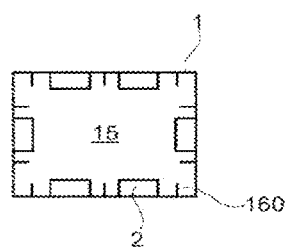
FIG. 29 schematically shows a top view of a first combined lamination/bent device with bent slides arranged on a draping frame.

In the embodiment shown in FIG. 29, the bent means 160 are located next to the grippers 2 attached to the draping frame 1.

Figure 30:
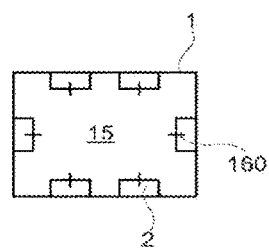
FIG. 30 shows a schematic top view of a second combined lamination/bent device with bent slides arranged on grippers.

In the embodiment shown in FIG. 30, the bent means 160 are arranged on the grippers 2.

Figure 31:
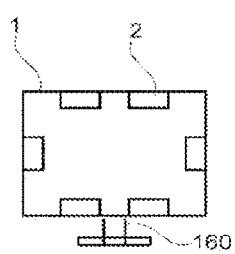
FIG. 31 shows a schematic top view of a fourth combined lamination/bent device with bent slides arranged at a lamination station.

In the embodiment shown in FIG. 31, the bent means 160 are arranged on a frame (not numerated separately here) of the laminating device.

Figure 32:
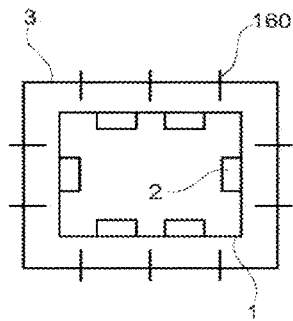
FIG. 32 schematically shows a top view of a third combined lamination/bent device with bent slides arranged on a further frame part.

And in the embodiment shown in FIG. 32, the bent means 160 are located on the frame part 3 of the laminating device.

Figure 33:
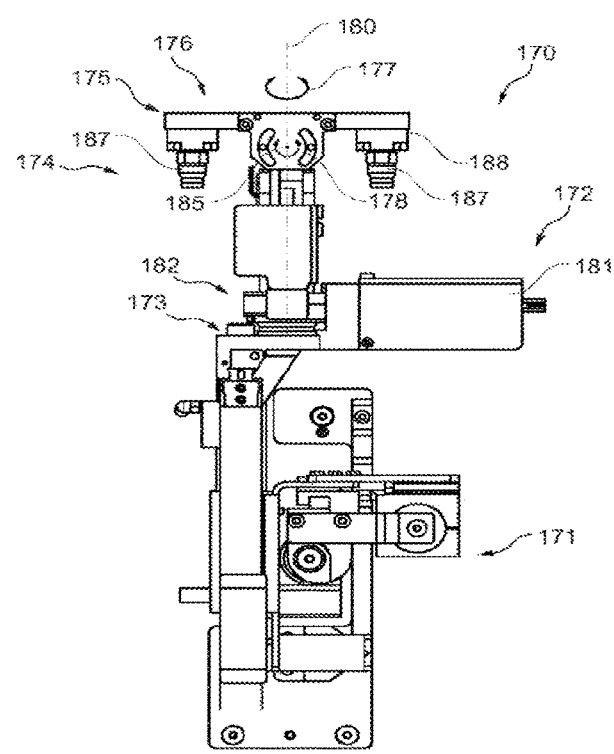
FIG. 33 schematic supervision of an alternative gripper comprising a gripper chassis and a gripper head part with a rotary drive comprising a worm gear.

According to FIG. 33, an alternative gripper 170 is shown, which is substantially the same as the gripper 2 shown in FIG. 2.

The gripper 170 has a gripper chassis 171, on the front side 172 or end face 173 of which a gripper head part 174 is arranged, on which the actual gripper jaw elements 175 and 176 of the gripper 170 are mounted, whereby in the top view only the upper gripper jaw element 176 is visible here.

The gripper 170 with its gripper head part 174 faces a draping room 15.

The gripper head part 174 has a degree of freedom 177 compared to the gripper chassis 171 and a further degree of freedom 178.

The degree of freedom 177 is provided by the axis of rotation 180 of the rotary actuator 181, wherein the rotary actuator 181 includes a worm gear 182. In this respect, the gripper jaw elements 175 and 176 on the gripper head part 174 can be rotated about the axis of rotation 180 relative to the gripper chassis 171 in a motorized and automated manner. The axis of rotation 180 is perpendicular to the end face 173, so that this is a horizontal axis (not renumbered).

The further degree of freedom 178 results around the vertical axis 185, around which the gripper jaw elements 175 and 176 can be swiveled manually.

Also clearly visible are coolant connections 187 on the rear sides 188 of the gripper jaw elements 175 and 176, to which a temperature-regulating means can be connected in order to allow coolant to flow through the gripper jaw elements 175 and 176.

According to FIG. 34, a further device 190 is provided for forming and/or laminating a film element 20 on a carrier part 30, the device 190 comprising a plurality of grippers 2 and/or 170 not shown herein and as well as a carrier part respectable 63, which is also not shown here and which is attached to a manipulator 71 (not shown, upper tool 53) of a laminating tool 51 (also not shown). The device 190 comprises a draping room 15 or laminating room 15, in which a lower tool 52 is arranged. In this embodiment, the lower tool 52 may include a mold shell part 59 (not shown).

Advantageously, the further device 190 and/or the lower tool 52 of the latter has both punching knife segments 191 (only numbered here by way of example) of a punching device 192 and sealing slide segments 194 of a sealing device 195 of a pressure difference device which is not shown further.

The punching knife segments 191 and the sealing slide segments 194 are arranged next to each other, whereby all punching knife segments 191 and sealing slide segments 194 are individually controllable and displaceable, whereby on the one hand punching forces on the other device 190 can be advantageously reduced (punching knife segments 191) and on the other hand a sealing device 195 can be positioned in a more differentiated manner and closer to the carrier part 30, whereby a non-negligible amount of film material can be saved overall.

At this point, it should be explicitly pointed out that features of the solutions described above or in the claims and/or figures can also be combined, if necessary, in order to be able to implement or achieve the explained features, effects and advantages in a correspondingly cumulative manner.

It is to be understood that the above-described embodiments are merely first embodiments of the invention. In this respect, the design of the invention is not limited to these embodiments.

All features disclosed in the application documents are claimed to be essential to the invention, provided that they are new individually or in combination with each other compared to the prior art.

LIST OF REFERENCES 1 draping frame
2 motor driven gripper
3 frame part
4 left side area
5 right side area
6 front side area
7 rear side area
8 housing
9 under side
10 upper side
15 draping room and/or laminating room
16 longitudinal traverses
17 transverse traverses
20 film element
22 gripper chassis/gripper jaw elements
24 front side
25 gripper head part
26 lower gripper jaw elements
27 upper gripper jaw elements
28 temperature-regulating
29 tensile force measuring device
30 carrier part
31 contour
32 approach curve 33 visible surface
35 grid
37 first automotive components and/or laminated components
38 second automotive components and/or laminated components
39 third automotive components and/or laminated components
50 device
51 laminating tool
52 lower tool
53 upper tool
55 displacement mechanism
56 frame
57 vertical displacement axis
58 base part
59 shell parts
60 base
63 carrier part respectable
65 insertion device
70 robot device
71 manipulator
75 removable device
78 transfer station
80 feeding and/or inserting device
81 feeding and/or inserting section
82 loading position
85 heating unit
86 upper heating device
87 lower heating device
89 feeding position
90 starting position
100 carrier part magazine
103 insertion position
104 trimming station
105 provision position
107 system
108 second device
110 processing line
111 input side
112 output side
114 bent station
116 second system
117 third device
119 discharge station
120 discharge table
123 third system
124 forth device
126 double system
127 fifth device
130 further double system
131 adhesive application station
132 adhesive application lines
133 adhesive application device
134 adhesive application robot
135 adhesive application manipulator
136 sixth device
140 fully automated system
141 seventh device
142 loading station
143 gripping device
150 cutting pattern
151 film grit material
160 bent means and/or bent side
170 gripper
171 gripper chassis and/or gripper jaw elements
172 front side
173 end face
174 gripper head part
175 lower gripper jaw elements
176 upper gripper jaw elements
177 degree of freedom
178 further degree of freedom
180 axis of rotation and/or horizontal axis
181 rotary actuator
182 worm gear
185 vertical axis
187 coolant connections
188 back side
190 further device
191 punching knife segments
192 punching device
194 sealing slide segments
195 sealing device

The invention claimed is:

1. A gripper for a device for at least one of forming and laminating a film element, the gripper comprising: a gripper chassis, a gripper head arranged on the gripper; at least two gripper jaw elements arranged opposite one another and configured, to be movable along at least one degree of and configured to grip the film element; at least one drive device configured and arranged to adjust the at least one-axis of movement; wherein the at least two gripper jaw elements are configured to grip the film element thereby enabling the forming and laminating of the film element; wherein at least one of the gripper jaw elements has temperature-regulating means configured to regulate temperature; wherein the gripper head is configured to move with respect to the gripper chassis in at least with one-axis of movement; wherein the gripper head is movable with respect to at least one spatial axis, which is different from spatial axes of the gripper chassis; wherein the gripper head is configured to adjust three-dimensionally relative to the gripper chassis and* wherein the gripper head is configured to adjust three-dimensionally relative to the gripper chassis; wherein gripper head is configured to rotate about an axis of rotation by means of a rotary drive; wherein the gripper head is configured to adjust three-dimensionally relative to the gripper chassis.

2. The gripper according to claim 1, wherein the gripper head part of the gripper is configured to be movable with respect to at least one spatial axis which is different from spatial axes of the gripper chassis with respect to which the gripper chassis is movable.

3. The gripper according to claim 1, wherein the gripper head part of the gripper is rotatable about an axis of rotation by means of a rotary.

4. The gripper according to claim 1, wherein an axis of rotation of the gripper head part is arranged perpendicular to an end face of the gripper.

5. The gripper according to claim 1, wherein the device comprises a draping frame.

6. The gripper according to claim 3, wherein the rotary actuator comprises a worm gear.

7. The gripper according to claim 4, wherein the axis of rotation of the gripper head is a horizontal axis.

* * * * *